(12) United States Patent
Eguchi et al.

(10) Patent No.: US 7,392,364 B2
(45) Date of Patent: Jun. 24, 2008

(54) STORAGE SYSTEM HAVING DYNAMIC VOLUME ALLOCATION FUNCTION

(75) Inventors: Yoshiaki Eguchi, Yokohama (JP);
Yasutomo Yamamoto, Sagamihara (JP);
Yasuyuki Nagasoe, Odawara (JP)

(73) Assignee: Hitachi, Ltd., Tokyo (JP)

( * ) Notice: Subject to any disclaimer, the term of this patent is extended or adjusted under 35 U.S.C. 154(b) by 68 days.

(21) Appl. No.: 10/957,059

(22) Filed: Oct. 1, 2004

(65) Prior Publication Data

US 2005/0144384 A1  Jun. 30, 2005

(30) Foreign Application Priority Data

Dec. 26, 2003  (JP)  ............................. 2003-432014
Aug. 19, 2004  (JP)  ............................. 2004-238983

(51) Int. Cl.
*G06F 12/08*  (2006.01)
(52) U.S. Cl. ....................................... 711/202; 711/170
(58) Field of Classification Search ........................ None
See application file for complete search history.

(56) References Cited

U.S. PATENT DOCUMENTS

| | | | |
|---|---|---|---|
| 5,193,184 A | 3/1993 | Belsan et al. | |
| 5,197,055 A * | 3/1993 | Hartung et al. | .......... 369/30.32 |
| 5,394,532 A | 2/1995 | Belsan | |
| 5,404,485 A | 4/1995 | Ban | |
| 5,701,284 A | 12/1997 | Lee | |
| 5,745,789 A | 4/1998 | Kakuta | |
| 5,889,937 A | 3/1999 | Tamagawa | |
| 5,963,971 A | 10/1999 | Fosler et al. | |
| 6,038,639 A | 3/2000 | O'Brien et al. | |
| 6,073,218 A * | 6/2000 | DeKoning et al. | .......... 711/150 |
| 6,105,103 A | 8/2000 | Courtright, II et al. | |
| 6,167,459 A | 12/2000 | Beardsley et al. | |
| 6,304,940 B1 | 10/2001 | Beardsley | |
| 6,349,313 B1 | 2/2002 | Momoh et al. | |
| 6,356,915 B1 | 3/2002 | Chtchetkine et al. | |
| 6,512,652 B1 | 1/2003 | Nelson et al. | |
| 6,519,678 B1 | 2/2003 | Basham et al. | |

(Continued)

FOREIGN PATENT DOCUMENTS

JP         06-004979         6/1992

(Continued)

OTHER PUBLICATIONS

Baker, The Windows NT Device Driver Book, A Guide for Programmers, Prentice Hill Publishers, 1997, pp. 63-71.

(Continued)

*Primary Examiner*—Gary Portka
(74) *Attorney, Agent, or Firm*—Mattingly, Stanger, Malur & Brundidge, PC

(57) ABSTRACT

Access to a plurality of logical devices is enabled regardless of the number of ports provided in a storage system and the number of logical devices that can be allocated to a single port, thereby improving the usability of the logical devices. A storage system comprises a plurality of logical devices, a target device which is the object of access from a computer, and a juke box system for allocating one of the plurality of logical devices to the target device. The juke box system changes the logical device that is allocated to the target device in accordance with a request from the computer.

8 Claims, 18 Drawing Sheets

U.S. PATENT DOCUMENTS

| | | | |
|---|---|---|---|
| 6,591,356 | B2 | 7/2003 | McMurdie et al. |
| 6,606,690 | B2 | 8/2003 | Padovano |
| 6,622,177 | B1 | 9/2003 | Eilert et al. |
| 6,708,265 | B1 | 3/2004 | Black |
| 6,725,331 | B1 | 4/2004 | Kedem |
| 6,754,661 | B1 | 6/2004 | Hallin et al. |
| 6,760,828 | B1 | 7/2004 | Black |
| 6,839,827 | B1 | 1/2005 | Beardsley et al. |
| 6,857,059 | B2 | 2/2005 | Karpoff et al. |
| 6,957,303 | B2 | 10/2005 | Fujimoto et al. |
| 6,977,927 | B1 * | 12/2005 | Bates et al. ............... 370/381 |
| 7,069,385 | B2 | 6/2006 | Fujimoto et al. |
| 7,124,265 | B2 | 10/2006 | Nagasoe et al. |
| 7,130,973 | B1 * | 10/2006 | Chong et al. ............... 711/162 |
| 2002/0069245 | A1 | 6/2002 | Kim |
| 2002/0073297 | A1 | 6/2002 | Mizuno et al. |
| 2002/0143903 | A1 | 10/2002 | Uratani et al. |
| 2002/0144057 | A1 | 10/2002 | Li et al. |
| 2003/0004981 | A1 | 1/2003 | Kaneda et al. |
| 2003/0093439 | A1 | 5/2003 | Mogi et al. |
| 2003/0126327 | A1 | 7/2003 | Pesola et al. |
| 2003/0131182 | A1 * | 7/2003 | Kumar et al. ............... 711/5 |
| 2003/0156345 | A1 | 8/2003 | Fayeulle et al. |
| 2003/0159058 | A1 | 8/2003 | Eguchi et al. |
| 2003/0193732 | A1 | 10/2003 | Hakamata et al. |
| 2003/0200398 | A1 * | 10/2003 | Harris ............... 711/152 |
| 2003/0204597 | A1 | 10/2003 | Arakawa et al. |
| 2003/0204700 | A1 | 10/2003 | Biessener et al. |
| 2003/0212859 | A1 | 11/2003 | Ellis et al. |
| 2003/0221077 | A1 | 11/2003 | Ohno et al. |
| 2003/0229645 | A1 | 12/2003 | Mogi et al. |
| 2004/0054648 | A1 | 3/2004 | Mogi et al. |
| 2004/0128443 | A1 | 7/2004 | Kaneda et al. |
| 2004/0143832 | A1 | 7/2004 | Yamamoto et al. |
| 2004/0193827 | A1 | 9/2004 | Mogi et al. |
| 2005/0018339 | A1 | 1/2005 | Tanner |
| 2005/0144383 | A1 | 6/2005 | Higaki et al. |
| 2005/0210098 | A1 | 9/2005 | Nakamichi et al. |
| 2005/0267986 | A1 | 12/2005 | Murakami et al. |

FOREIGN PATENT DOCUMENTS

| | | |
|---|---|---|
| JP | 06-004979 | 1/1994 |
| JP | 2000-112822 | 10/1998 |
| JP | 2000-293314 | 4/1999 |
| JP | 2000-112822 | 4/2000 |
| JP | 2000-293314 | 10/2000 |
| JP | 2002-288108 | 3/2001 |
| JP | 2002-288108 | 10/2002 |

OTHER PUBLICATIONS

Dar, Shaul et al, "dbSwitch™—Towards a Database Utility", SIGMOD, Jun. 13-18, 2004, Paris, 5 pages.

Anderson, Darrell C. et al, "Interposed Request Routing for Scalable Network Storage", ACM Transactions on Computer Systems, vol. 20, No. 1, Feb. 2002, pp. 25-48.

Lee, Edward K. et al, "Petal: Distributed Virtual Disks", Systems Research Center, ASPLOS VII, Oct. 1996, pp. 84-92.

SANRAD: iSCSI Virtualization Switch—Product Family Overview, "Storage Management and Virtualization Product for Building SANs", Nov. 24, 2002, 1 page.

SANRAD: "iSCSI Virtualization Switch 3000" provides iSCSI briding and virtualization, iSCSI is an emerging standard with the IPS group in the IETF (The Internet Engineering Task Force), Jun. 18, 2002, 2 pages.

"SANRAD Application Note: Using iSCSI to Deliver Remote Backup Service", APP-001-01, SANRAD, 2003, pp. 1-11.

"SANRAD Application Note: Data Migration Solution Transferring Data Between Storage Systems over Fibre-channel or SCSI connections", APP-003-03, SANRAD, 2003, pp. 1-9.

"SANRAD Application Note: Migrating Individual SERVERS to an iSCSI SAN", APP-004-01, SANRAD, 2003, pp. 1-15.

Allen, Doug, "From the Data Center to the Network: Virtualization Bids to Remap the LAN", itarchitectmag, Feb. 5, 2004, 8 pages.

Toigo, Jon William et al, "Introducing Time Addressable Storage: A Common-Sense Approach to Data Protection", Toigo Partners International LLC, May 28, 2003, pp. 1-14.

Art Baker, "The Windows NT Device Driver Book," Prentice Hall (1997), pp. iii, and 62-71.

Sanrad Application Note: "Using ISCSI to Deliver Remote Backup Service," 2003, pp. 1-11.

Sanrad Application Note: "Migrating Individual Servers to an iSCSI SAN," 2003, pp. 1-15.

Doug Allen, "From the Data Center to the Network: Virtualization Bids to Remap the Lan," Feb. 5, 2004, 8 pages.

Anderson et al., "Interposed Request Routing for Scalable Network Storage", ACM Transactions on Computer Systems, vol. 20, No. 1, Feb. 2002, pp. 25-48.

Lee et al.,"Petal: Distributed Virtual Disks" Systems Research Center, 1996 ACM, pp. 84-92.

"iSCSI Virtualization Switch-Product Family Overview", 1 page, http://www.itseccity.de/content/worldwidenews/productnews/021124wor_akt_sanrad.html.

"iSCSI Virtualization Switch 3000 Provides iSCSI Bridging and Virtualization", 2 pages, http://www.itseccity.de/content/worldwidenews/qaa/020618_wor_qaa_sanrad.html.

Sanrad Application Note: "Data Migration Solution Transferring DATA Between Storage Systems over Fibre-Channel or SCSI Connections", 2003, pp. 1-9.

Jon W. Toigo, "Introducing Time Addressable Storage: A Common-Sense Approach to Data Protection", Toigo Partners Intnl. LLC, May 28, 2003, pp. 1-14.

Shaul Dar et al., "dbSwitch-Towards a Database Utility", SIGMOD 2004, Jun. 13-18, Paris, France, 5 pages.

* cited by examiner

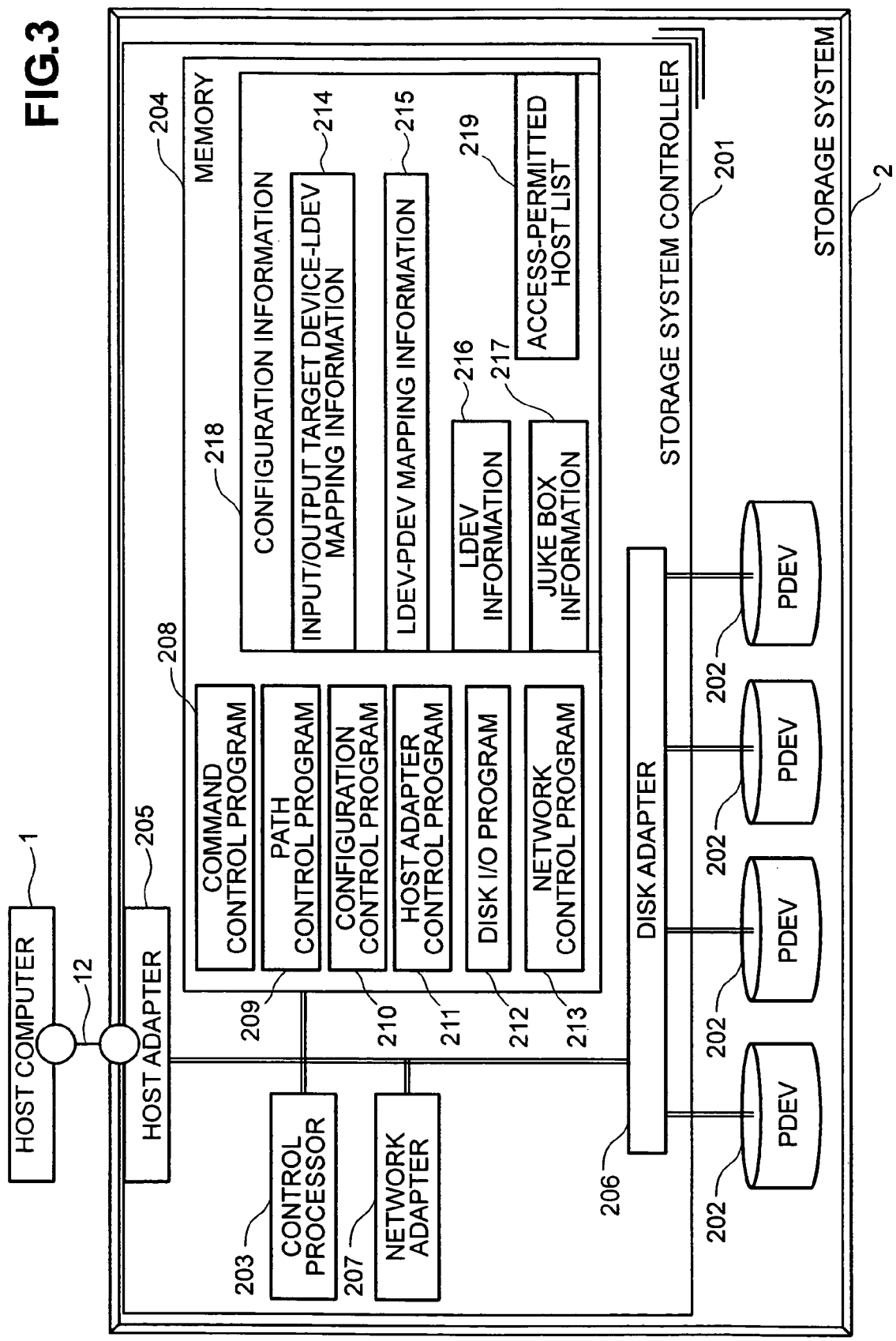

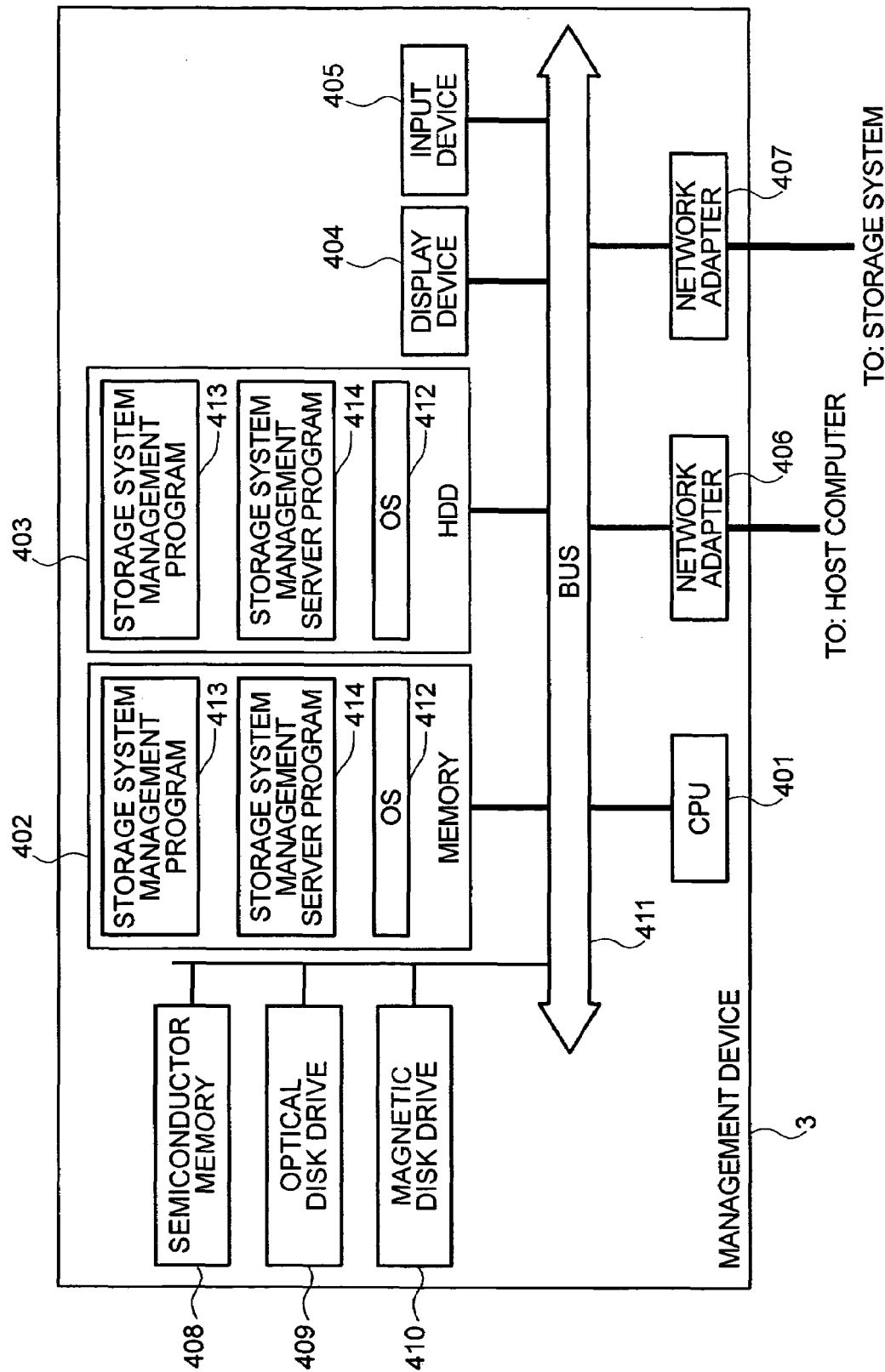

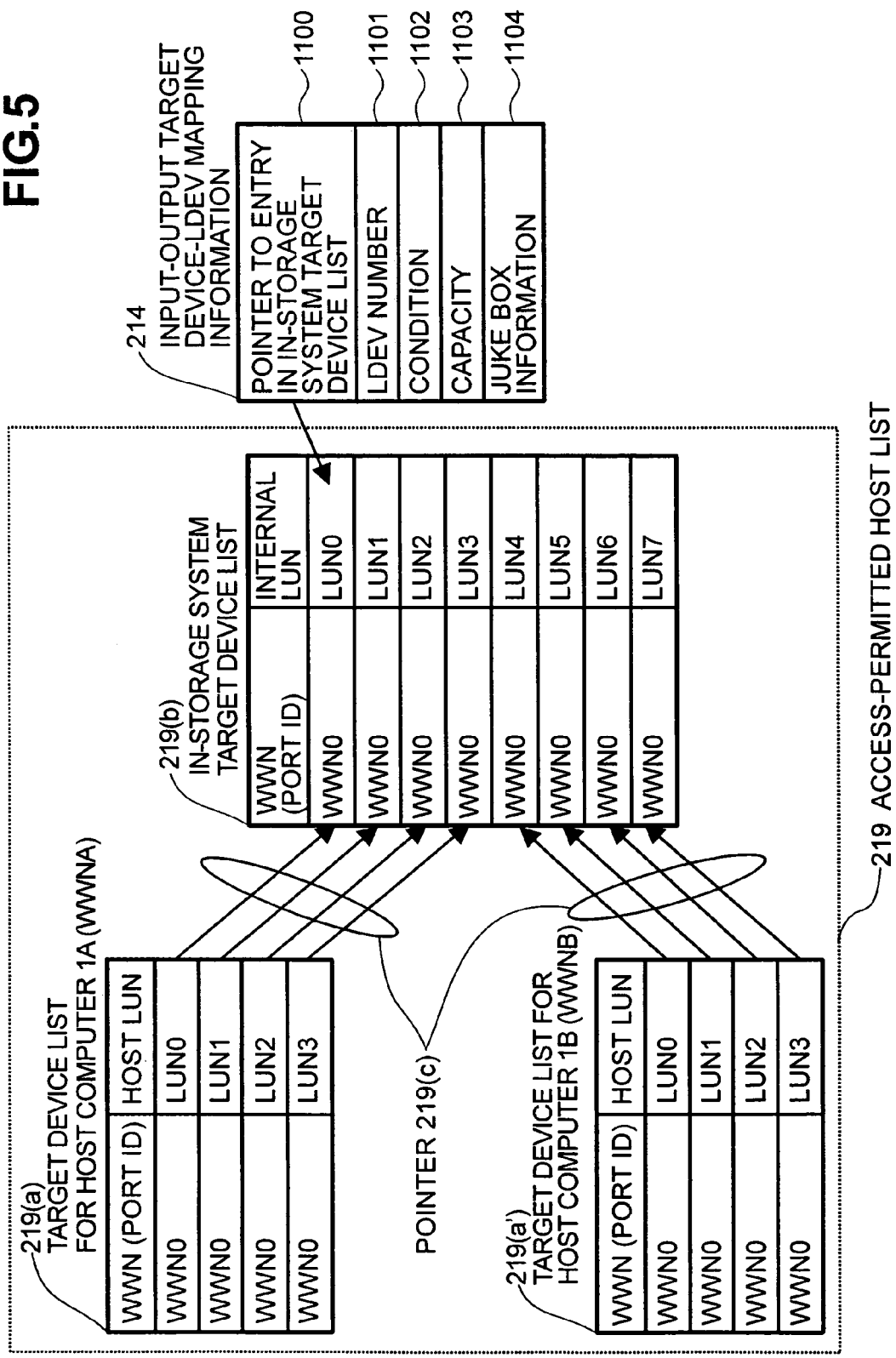

FIG.6

217 JUKE BOX INFORMATION

- IDENTIFICATION INFORMATION FOR INPUT/OUTPUT TARGET DEVICE (PORT ID (WWN) AND INTERNAL LUN) — 1200
- LDEV NUMBER — 1201
- PATH DEFINITION TIME — 1202
- PATH DETACHMENT TIME — 1203
- LATEST ACCESS PATH DEFINITION TIME — 1204
- LATEST ACCESS PATH DETACHMENT TIME — 1205

FIG.7

216 LDEV INFORMATION

- LDEV NUMBER — 1000
- CONDITION — 1001
- PTH DEFINITION — 1002
- PROGRAM USAGE INFORMATION — 1003
- PROGRAM RESERVATION INFORMATION — 1004
- JUKE BOX INFORMATION — 1005
- CAPACITY — 1006
- EMULATION TYPE — 1007
- ATTRIBUTE (Read only, Read/Write, Protect, SVOL-Disable) — 1008
- ATTRIBUTE SETTING TIME — 1009
- ATTRIBUTE MODIFICATION PROHIBITING PERIOD — 1010

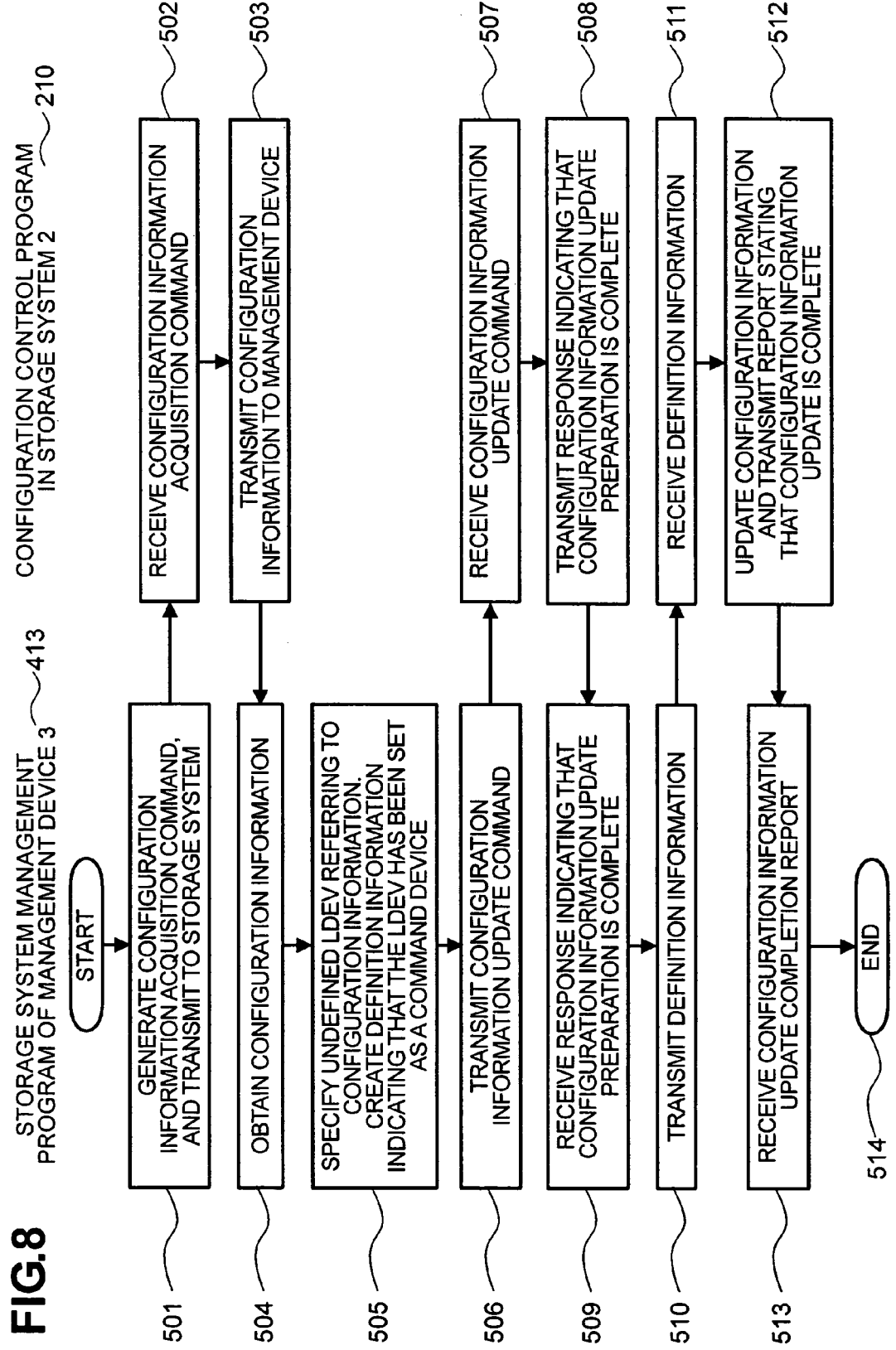

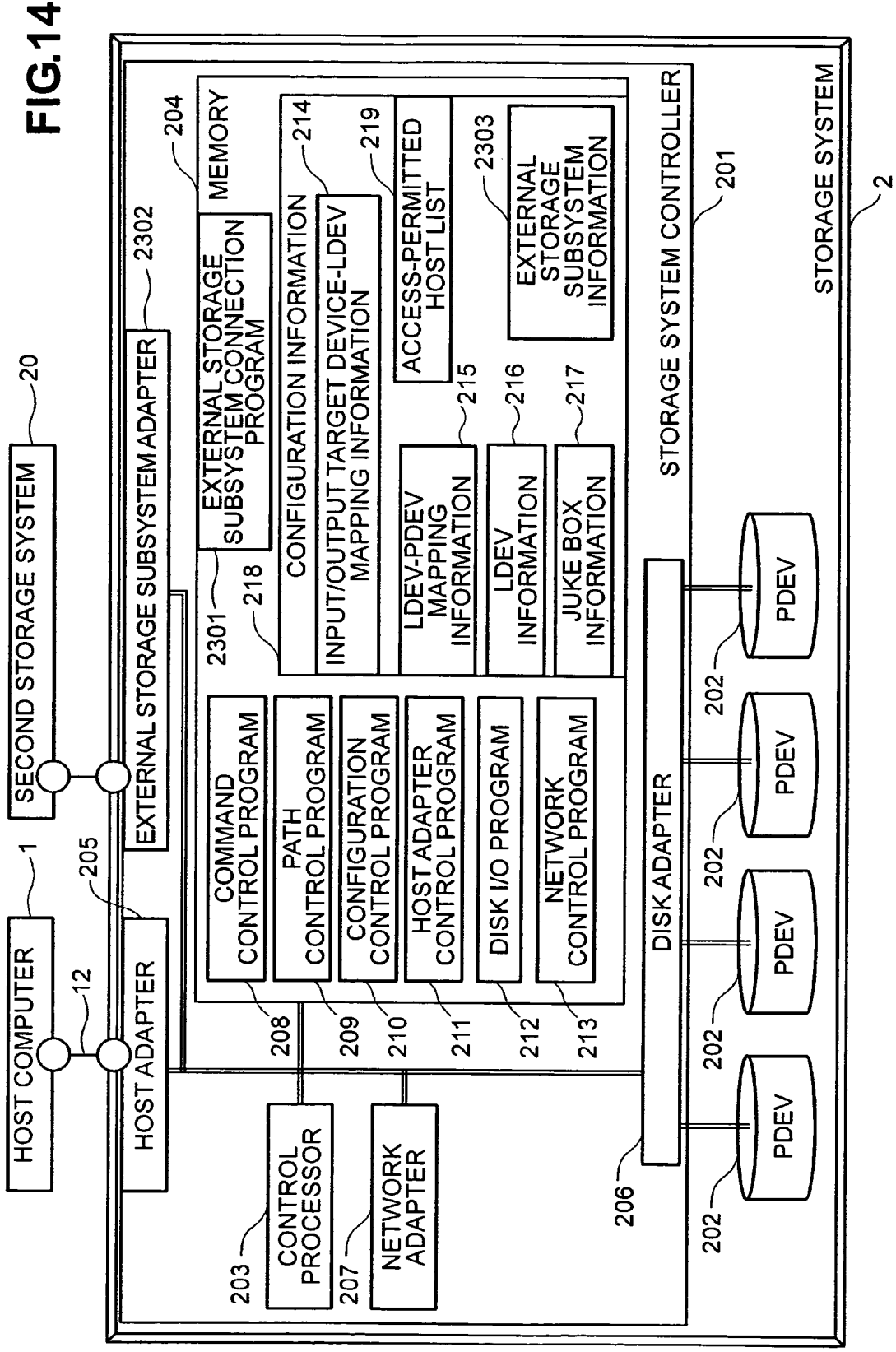

FIG.15

2303 EXTERNAL STORAGE SUBSYSTEM INFORMATION

| | |
|---|---|
| EXTERNAL STORAGE SUBSYSTEM LU ID (WWN, LUN) | 1900 |
| USAGE PORT NUMBER, LINK CONDITION | 1901 |
| CAPACITY | 1902 |
| NUMBER OF MAPPING DESTINATION LDEV | 1903 |
| DEVICE CONDITION (Not Ready, Blockade, Formatting, Normal etc.) | 1904 |
| CONNECTION DEFINITION SETTING TIME | 1905 |
| CONNECTION DEFINITION DETACHMENT SETTING TIME | 1906 |
| LATEST CONNECTION DEFINITION SETTING TIME | 1907 |
| LATEST CONNECTION DEFINITION DETACHMENT TIME | 1908 |
| ATTRIBUTE (Read/Write, Read Only, Protect, SVOL-Disable) | 1909 |
| ATTRIBUTE SETTING TIME | 1910 |
| ATTRIBUTE MODIFICATION PROHIBITING PERIOD | 1911 |
| PREVIOUS MAPPING LDEV NUMBER | 1912 |
| PREVIOUS CONNECTION PORT NUMBER | 1913 |

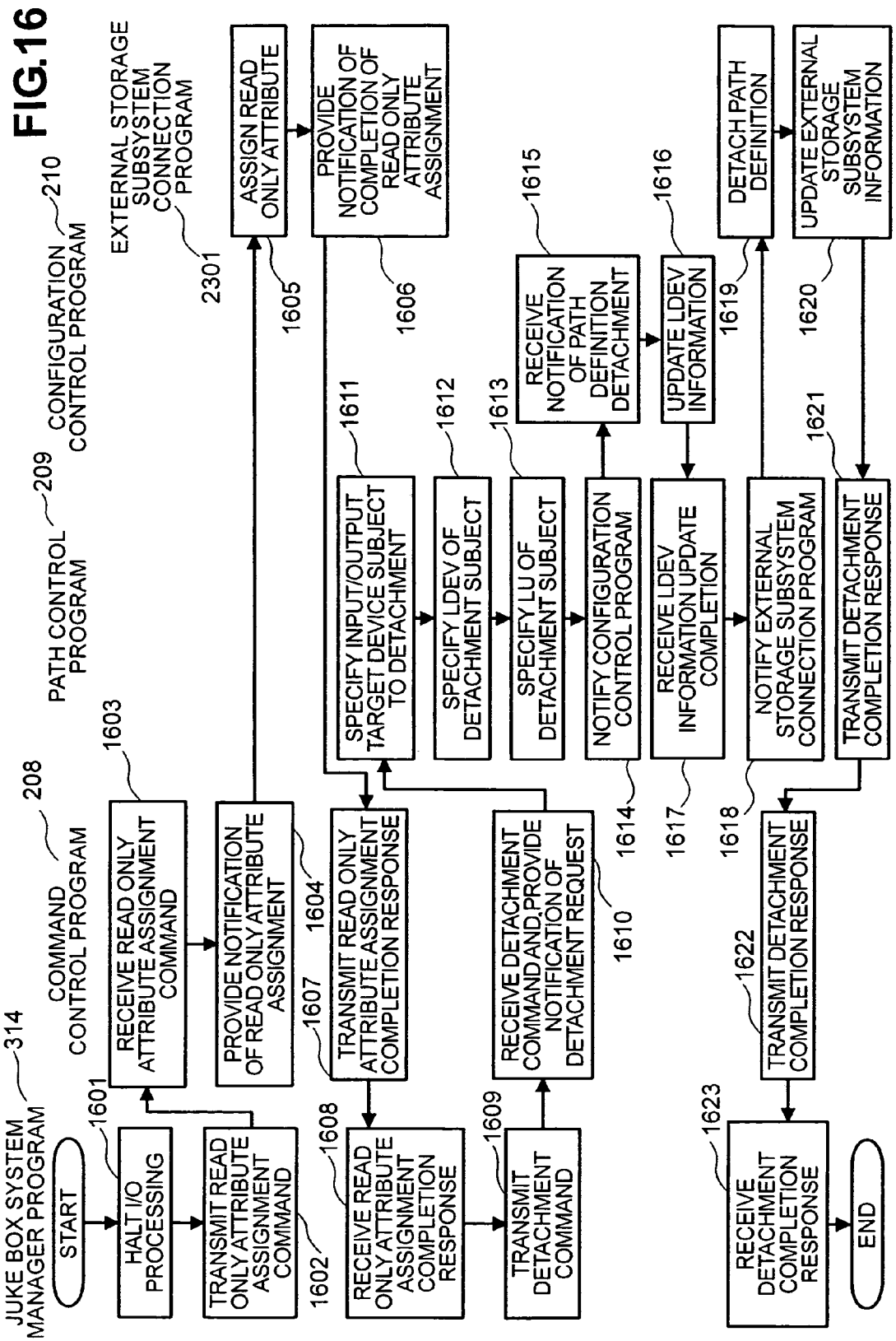

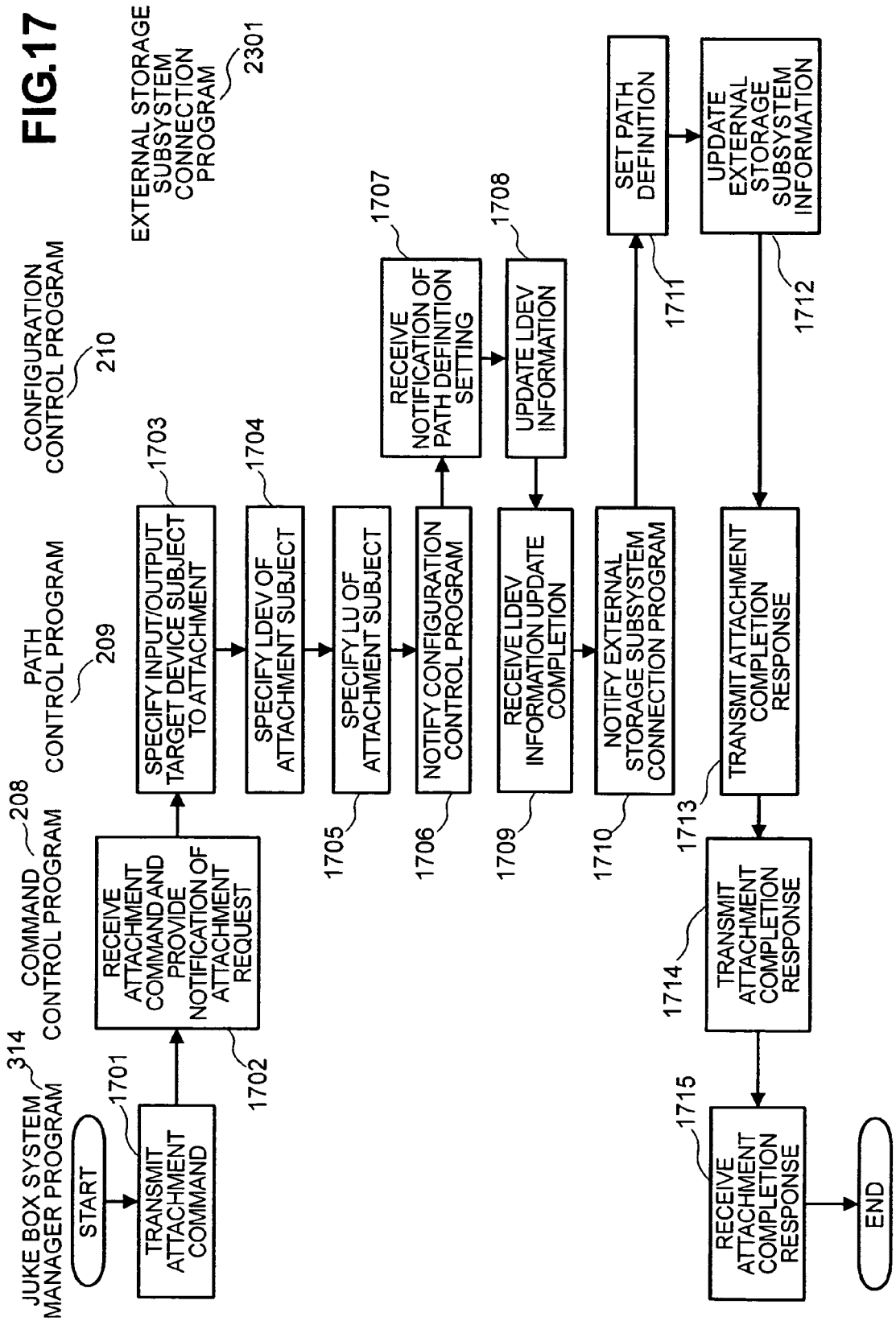

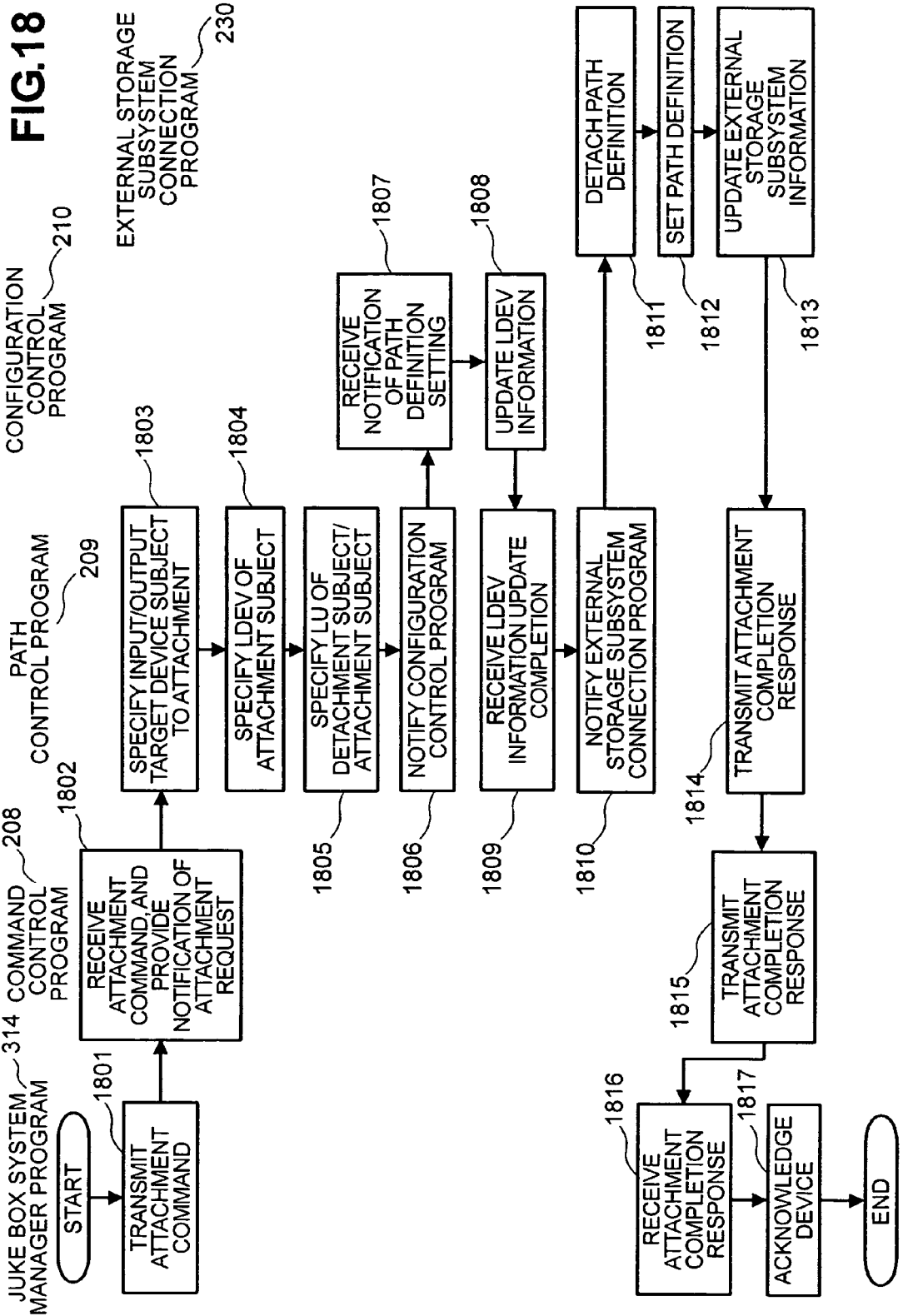

STORAGE SYSTEM HAVING DYNAMIC VOLUME ALLOCATION FUNCTION

CROSS-REFERENCES TO RELATED APPLICATIONS

This application relates to and claims priority from Japanese Patent Application No. 2004-432014, filed on Dec. 26, 2003, the entire disclosure of which is incorporated herein by reference.

This application also relates to and claims priority from Japanese Patent Application No. 2004-238983, filed on Aug. 19, 2004, the entire disclosure of which is incorporated herein by reference.

BACKGROUND

The present invention relates to a storage system for storing data used by a computer.

In recent years, the amount of data handled by computers has increased dramatically, and hence storage devices for storing data are increasing in capacity. At the same time, large storage systems comprising a plurality of disk devices are being designed to store large volumes of data in an aggregated fashion, rather than dispersing these large volumes of data for storage in a large number of small storage devices.

For example, a storage system disclosed in Japanese Unexamined Patent Application Publication 2003-242039 comprises a plurality of physical devices, and manages storage regions constituted by these physical devices as logical devices. A host computer connected to the storage system can access a logical device by specifying a port ID (a WWN (World Wide Name) for identifying a port uniquely) and a LUN (Logical Unit Number) corresponding to the logical device.

Note that hereafter, a device that is specified by a port ID and a LUN, and recognized as a subject of access from a host computer, will be referred to as a target device.

SUMMARY

There is usually a limit to the number of logical devices that can be allocated to a port of a storage system. Hence, even if the number of physical devices provided in a storage system is increased, there are restrictions on the number of logical devices that can be accessed from the host computer.

Hence, a technique is disclosed for improving the usability of a logical device by permitting access to a plurality of logical devices, regardless of the number of ports comprised in a storage system and the number of logical devices that can be allocated to a single port.

A storage system comprises plural logical devices, plural target devices, each of which is an access target of a computer, and a juke box system which allocates anyone of the plural logical devices to a target device.

The juke box system changes the logical device allocated to the target device in accordance with a command from the computer to a command device, which is one of the plural target devices.

Thus the usability of the logical devices provided in the storage system can be improved.

BRIEF DESCRIPTION OF THE DRAWINGS

FIG. 3 is a view showing a constitutional example of a storage system;

FIG. 4 is a view showing a constitutional example of a management device;

FIG. 5 is a view showing an example of an access-permitted host list and target device-LDEV mapping information;

FIG. 6 is a view showing an example of juke box information;

FIG. 7 is a view showing an example of LDEV information;

FIG. 8 is a view showing an example of definition processing performed by a juke box system;

FIG. 14 is a view showing a constitutional example of a storage system in the second embodiment;

FIG. 15 is a view showing an example of external storage subsystem information;

FIG. 16 is a view showing an example of detachment processing in the second embodiment;

FIG. 17 is a view showing an example of attachment processing in the second embodiment;

FIG. 18 is a view showing an example of reattachment processing in the second embodiment.

DESCRIPTION OF THE PREFERRED EMBODIMENTS

Embodiments of the present invention will be described below using the drawings. Note that the present invention is not limited to or by these embodiments.

[First Embodiment]

(1) System Configuration

Figure 1:
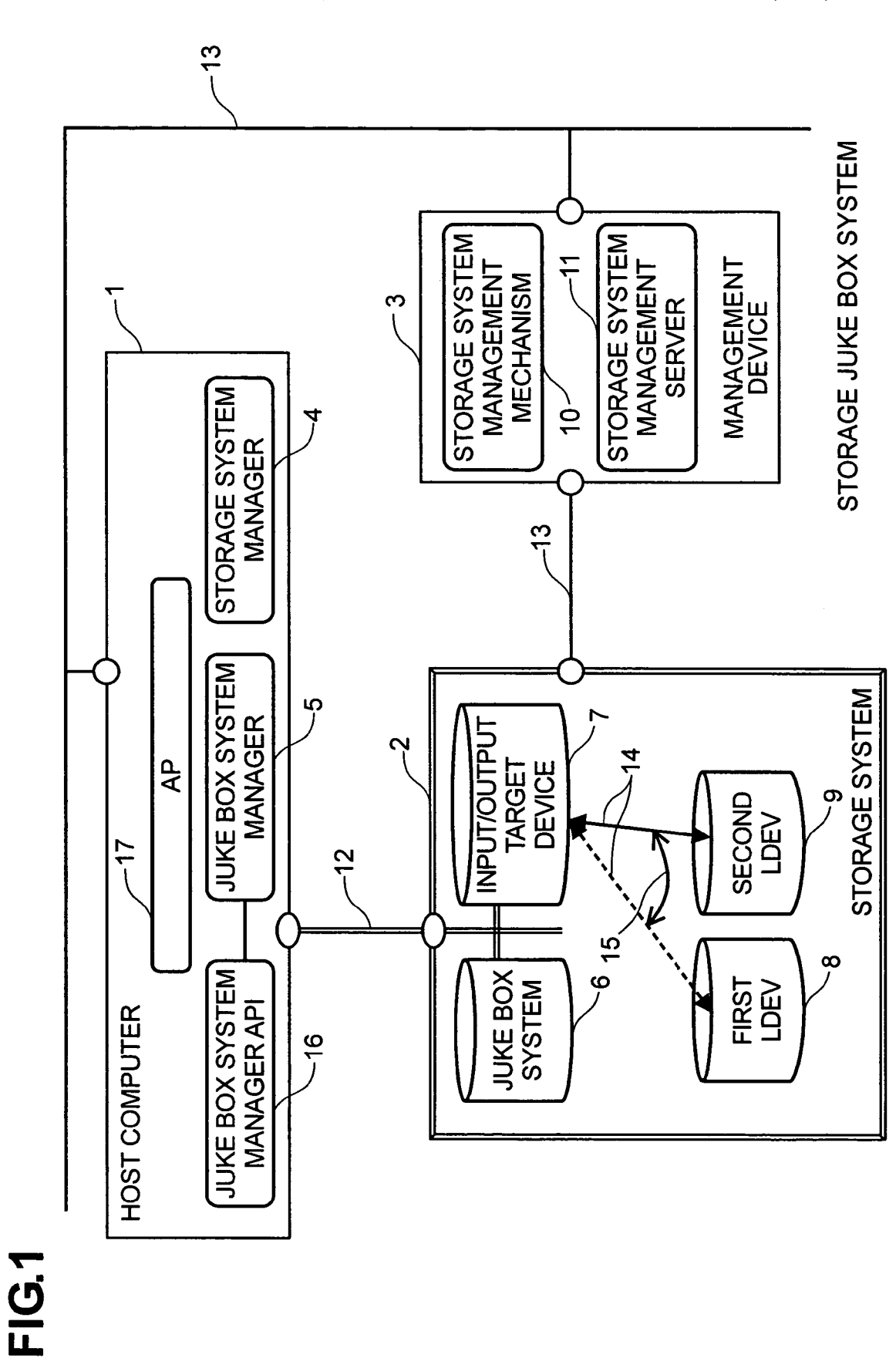
FIG. 1 is a view showing an example of a system configuration in a first embodiment.

FIG. 1 is a view showing one example of the system configuration of this embodiment.

This system comprises one or more host computers 1, one or more storage systems 2, and one or more management devices 3. The host computer 1 and storage system 2 are connected by a first communication path 12, enabling the host computer 1 to perform data input/output processing to and from the storage system 2 via the first communication path 12. The host computer 1 and management device 3 are connected by a second communication path 13, and the management device 3 and storage system 2 are also connected by the second communication path 13. Thus the host computer 1 is able to perform setting processing on the storage system 2 remotely through the second communication path 13 and management device 3.

Optical cable, copper wire, or similar is used for the first communication path 12 and second communication path 13. The communication protocols that may be used in the first communication path 12 and second communication path 13 include Ethernet, FDDI, Fiber Channel, SCSI, Infiniband, TCP/IP, iSCSI, and so on. The communication protocols used in the first communication path 12 and second communication path 13 may be the same or different, and there are no particular limitations thereon.

(2) Host Computer

At least one information processing program (to be referred to hereafter as application program 17 or simply AP 17) is operated on the host computer 1 shown in FIG. 1, and the host computer 1 performs input/output processing to and from the storage system 2 of the data required for the information processing executed by the AP 17.

In this embodiment, a juke box system manager API (Application Interface) 16, a storage system manager 4, and a juke box system manager 5 are operated on the host computer 1 as well as the AP 17 in order to realize a juke box function.

The juke box system manager 5 issues commands to the storage system 2 to allocate logical devices (also referred to as LDEV (logical device) hereafter) to the target devices provided in the storage system 2, and to detach the allocation of an LDEV when the LDEV is already allocated to a target device.

The juke box system manager API 16 mediates between the AP 17 and the juke box system manager 5 to ensure that the host computer 1 is able to use the juke box function of the storage system 2 in accordance with a request from the AP 17. In other words, the juke box system manager API 16 receives a request from the AP 17 and transmits this request to the juke box system manager 5. In accordance with the request received from the juke box system manager API 16, the juke box system manager 5 issues a command to the storage system 2 to allocate an LDEV to a target device or detach an allocation.

A conceivable example of a case in which the storage system 2 uses the juke box function in accordance with a request from the AP 17 is when the AP 17 is electronic mail software, for example, and received mail is classified into months and stored in separate LDEVs. To read mail received in November, for example, the AP 17 accesses the LDEV storing mail data for November. Then, when the AP 17 wishes to access mail received in December, the AP 17 must allocate the LDEV storing mail data for December to the target device in place of the LDEV storing the mail data for November. At this time, the juke box system manager API 16 receives a request to access the mail data for December from the AP 17, and hence instructs the juke box system manager 5 to allocate the LDEV storing the mail data for December to the target device. On the basis of this instruction, the juke box system manager 5 issues a command to the storage system to change the LDEV that is allocated to the target device.

The storage system manager 4 issues instructions to the storage system 2 to obtain configuration information regarding the LDEVs in the storage system, indicating whether or not the LDEVs provided in the storage system 2 are path-defined to a target device (that is, whether the LDEVs are allocated to a target device) so as to be capable of input/output processing, and so on.

Figure 2:
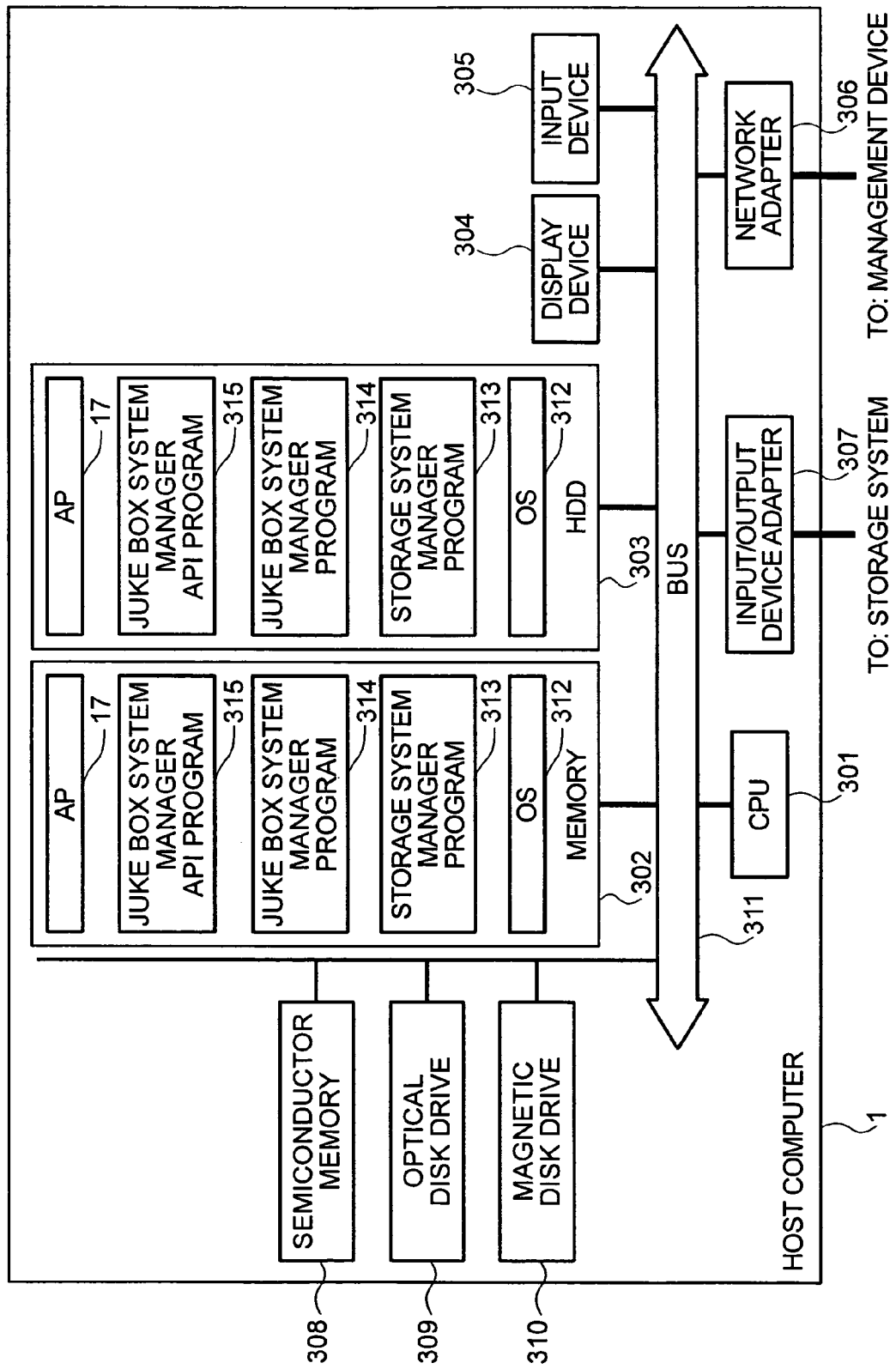
FIG. 2 is a view showing a constitutional example of a host computer.

FIG. 2 is a view showing an example of the host computer.

The host computer 1 comprises a CPU (central processing unit) 301, memory 302, a hard disk drive (HDD) 303, a display device 304, an input device 305, an input/output device adapter 307, and a network adapter 306. A plurality of each of these components may be provided. The host computer 1 may also comprise a semiconductor memory drive 308, an optical disk drive 309, a magnetic disk drive 310, and so on.

The HDD stores a program 312 required to operate the host computer (for example, an OS (operating system)), a juke box system manager program 314, a storage system manager program 313, a juke box system manager API program 315, and the AP 17. These programs stored in the HDD 303 are copied to the memory 302 via a bus 311 when processing is required, and executed by the CPU 301. Note that the storage system manager 4, juke box system manager 5, and juke box system manager API 16 illustrated in FIG. 1 are established when the CPU 301 executes the storage system manager program 313, the juke box system manager program 314, and the juke box system manager API program 315.

The input device 305 is used by a user of the host computer 1 to input data or commands into the host computer 1. The input device 305 may be a keyboard or a mouse, for example.

The display device 304 is used to display processing performed by the user, processing performed by the programs, LDEV configuration information obtained by the storage system manager 4, setting information, and so on, and therefore a monitor such as a CRT or TFT liquid crystal monitor may be used as the display device 304.

The network adapter 306 is connected to the second communication path 13 so that the host computer is able to communicate with the management device 3 via the network adapter 306.

The input/output device adapter 307 is connected to the first communication path 12 so that the host computer is able to perform data input/output processing to and from the storage system 2 via the input/output device adapter 307.

(3) Storage System

The storage system 2 shown in FIG. 1 comprises a target device 7, and a first LDEV 8 and a second LDEV 9 serving as logical devices.

Either the first LDEV 8 or the second LDEV 9 is mapped in the target device 7, and the target device 7 is thus recognized in the host computer 1 as a storage device having the capacity of the mapped LDEV. Once an LDEV has been mapped in the target device 7, the host computer 1 can access the LDEV mapped in the target device 7 by accessing the target device 7.

The storage system 2 comprises a juke box system 6. The juke box system 6 is implemented to realize the juke box function of the storage system 2, and realizes a functional interface (I/F) with the host computer. The juke box system 6 enables the LDEV allocated to the target device provided in the storage system 2 to be changed in accordance with a command from the host computer 1.

The juke box system 6 may be implemented according to several methods. For example:

1. A dedicated I/F for issuing instructions to the juke box function of the storage system 2 may be implemented in the host computer so that the juke box system receives and processes instructions using this dedicated I/F.
2. The jukebox system 6 is defined as a special target device provided in the storage system 2 so that when the host computer accesses this special target device using a standard I/F, the juke box system 6 processes instructions from the host computer.

The first method is a realistic method in cases such as when a certain company determines the specifications of a command I/F from the host computer to the storage system, for example in a mainframe (MF) computer. The second method is effective in a storage system employing an input/output I/F used as standard by a large number of vendors, such as an oft-used SCSI I/F, between the host computer and an external storage device of a computer system such as a so-called open system, for example.

When the second method is used, the juke box system 6 is implemented as a target device recognized by the host computer 1, similarly to the target device 7, and serves as a target device used to enable the host computer 1 to instruct the storage system 2 to use the juke box function. When the host computer 1 uses the juke box function of the storage system 2, the host computer 1 accesses the target device using a command in which a juke box function command has been attached to a standard read command or write command, and thus instructs control of the juke box function.

A device used as a target device when the host computer 1 transmits various commands to the storage system 2 is known as a command device, and an example of such a command device is disclosed in Japanese Unexamined Patent Application Publication 2002-288108.

Note that in FIG. 1, an example is illustrated in which the storage system 2 comprises a single target device and two LDEVs, but the number of target devices and LDEVs is not limited to the example shown in FIG. 1 and any number of target devices and LDEVs may be provided.

FIG. 3 is a view showing an example of the constitution of the storage system 2.

The storage system 2 comprises a storage system controller 201 and one or more physical devices (also referred to as PDEV hereafter) 202. The PDEV is a physical recording medium such as a hard disk drive, an optical disk, or tape.

The storage system controller 201 comprises a control processor 203, memory 204, a host adapter 205, a disk adapter 206, and a network adapter 207.

The host adapter 205 is connected to the host computer 1 via the first communication path 12, and serves as a device for receiving input/output requests from the host computer 1 and transmitting appropriate data to the host computer in accordance with a request from the host computer 1. The host adapter 205 comprises one or more I/O ports (to be referred to as ports hereafter), and each port is identified by a port ID (for example, a WWN in Fiber Channel). Moreover, one or more target devices can be accessed from each port. Each target device is identified using a set comprising a port ID (WWN) and a LUN (logical unit number). Note that in the example in FIG. 3, the storage system 2 is provided with a single host adapter 205, but the storage system 2 may be provided with a plurality of host adapters 205.

Unless stipulated below, it is assumed that in this embodiment, the I/O processing performed between the host computer and storage system utilizes Fiber Channel. However, I/O processing may be performed according to the communication protocols described above during the description of FIG. 1 using a port identifier and identifiers for the devices that can be accessed from the port. Hence the present invention is not limited to Fiber Channel.

The disk adapter 206 is used to write data into the PDEV 202 or read data from the PDEV in accordance with an input/output request from the host computer 1.

The network adapter 207 is a device for performing communication with the management device 3 via the second communication path 13.

A host adapter control program 211 for controlling the host adapter, a disk I/O program 212 for controlling the disk adapter, a network control program 213 for controlling the network adapter, a command control program 208 for interpreting commands such as I/O processing requests from the host, a path control program 209 for defining an LDEV as the target device 7 (that is, for allocating an LDEV to the target device), a configuration control program 210 for defining the LDEVs in the storage system 2 and so on, and configuration information 218, which is information relating to the LDEVs, PDEVS, and so on in the storage system, are stored in the memory 204 for controlling the storage system.

The configuration information 218 comprises target device-LDEV mapping information 214 (see FIG. 5), which is created and updated by the configuration control program 210, LDEV-PDEV mapping information 215, LDEV information 216 (see FIG. 7), juke box information 217 (see FIG. 6), and an access-permitted host list 219 (see FIG. 5).

The LDEVs are storage regions existing in the PDEVs inside the storage system 2. The storage system controller 201 manages and controls the LDEVs as logical storage devices. Note that an LDEV may be constituted by a storage region in a single PDEV, or as a storage region in a plurality of PDEVs. The configuration control program 210 creates the LDEV-PDEV mapping information 215 to define the relationship between the LDEVs and the storage regions within the PDEVs, and manages address correspondence between the LDEVs and PDEVs.

The control processor 203 executes the programs in the memory 204.

(4) Management Device

The management device 3 shown in FIG. 1 comprises a storage system management mechanism 10 and a storage system management server 11.

The storage system management mechanism 10 sets and holds configuration information in the interior of the storage system 2, and obtains configuration information from the storage system 2. The storage system management mechanism 10 also installs the programs to be operated by the storage system 2, monitors faults occurring in the interior of the storage system 2, notifies the user of these faults, and so on.

For example, the storage system management mechanism 10 is capable of defining the LDEVs inside the storage system 2, defining paths (that is, allocating an LDEV to the target device), introducing the juke box system into the storage system 2, obtaining definition information relating to the LDEVs, paths, and so on from the storage system 2, transmitting definition information to the storage system 2, instructing setting of the definition information, and so on.

The storage system management server 11 is a mechanism for providing the host computer with the functions of the storage system management mechanism 10. For example, the storage system management server 11 communicates with a client program operating on a computer such as the host computer 1 via the second communication path 13, receives requests transmitted from the client program to the storage system management mechanism 10, and transfers these requests to the storage system management mechanism 10. As a result, the storage system management mechanism 10 is able to perform setting processing on the storage system 2, obtain fault information, and so on via the second communication path 13 on the basis of requests from the client program.

To configure both the storage system management mechanism 10 and storage system management server 11, a program stored in memory provided in the management device 3 is executed by a control processor provided in the management device 3.

FIG. 4 is a view showing a constitutional example of the management device 3.

The management device 3 is implemented as a computer. The management device 3 comprises a CPU 401, memory 402, an HDD 403, a display device 404, an input device 405, and network adapters 406 and 407. Similarly to the host computer, each of these components may be provided in a plurality. The management device 3 may also comprise a semiconductor memory drive 408, an optical disk drive 409, a magnetic disk drive 410, and so on. These drive devices are used to install programs in the storage system 2 and management device 3 using appropriate media.

A program required to operate the management device 3 (for example, an OS 412), a storage system management program 413, and a storage system management server program 414 are stored in the HDD 403. When processing is required, these programs stored in the HDD 403 are copied to the memory 402 via a bus 411 and executed by the CPU 401. When the CPU 401 executes the storage system management program 413, the storage system management mechanism 10 is established, and when the CPU 401 executes the storage system management server program 414, the storage system management server 11 is established.

The input device 405 is used by a user of the management device 3 to input data or commands. The input device 405 may be a keyboard or a mouse, for example.

The display device 404 is used to display the processes and results of processing instructed by the user on the management device 3, the processes and results of processing executed by the programs, setting information, and so on, and therefore a monitor such as a CRT or TFT liquid crystal monitor may be used as the display device 404.

The network adapter 406 is connected to the host computer 1 via the second communication path 13. The network adapter 407 is connected to the storage system 2 via the second communication path 13. Note that the network adapters 406 and 407 may be constituted by the same device.

(5) Configuration Information

Next, the configuration information 218 provided in the storage system 2 will be described.

FIG. 5 is a view showing an example of the access-permitted host list 219 and target device-LDEV mapping information 214 provided in the storage system 2.

The access-permitted host list 219 is information in which identification information for the target devices that can be accessed by the host computer 1 (i.e. the WWN and LUN serving as the identification information for the ports) is recorded for each host computer 1 which accesses the storage system 2.

Here, two types of LUN, a host LUN and an internal LUN, exist. The host LUN is used to enable a host computer to access a target device of the storage system 2, and the internal LUN is used to enable the storage system 2 to identify the target devices provided therein uniquely.

The access-permitted host list 219 comprises a host computer target device list 219(a) in which the target devices that can be accessed by a host computer are registered for each host computer which accesses the storage system 2, an in-storage system target device list 219(b) in which the target devices existing within the storage system 2 are registered, and a pointer 219(c) showing the relationship between these two lists.

In the host computer target device list 219(a), host computer identification information (the WWN of the host computer), and a set comprising a port ID (WWN) and host LUN used when the host computer accesses a target device, are registered for each host computer. In the in-storage system target device list 219(b), a set comprising a port ID (WWN) and internal LUN for identifying the target devices provided in the storage system are registered. The pointer indicates the set of the WWN and internal LUN registered in the in-storage system target device list 219(b) to which the set of the WWN and host LUN registered in the host computer target device list 219(a) corresponds.

In the example in FIG. 5, when a host computer 1A identified by WWNA issues an access request to the storage system 2 specifying WWN=0, host LUN=0, the storage system 2 is able to determine that the object of the access request is the target device identified as WWN=0, internal LUN=0 using the access-permitted host list 219. When a host computer 1B identified by WWNB issues an access request to the storage system 2 specifying WWN=0, host LUN=0, the storage system 2 is able to determine that the object of the access request is the target device identified as WWN=0, internal LUN=4 using the access-permitted host list 219.

As illustrated above, in some cases the target device to be accessed by the request source host computer may differ, even when the same WWN=0, host LUN=0 is specified in the access request issued by the host computer. Therefore, the storage system 2 uses the host computer identification information (the WWN of the host computer) included in the access request to specify the target device to be accessed.

Also in the example in FIG. 5, a set of a WWN and a host LUN which corresponds to the target device identified by WWN=0, internal LUN=4 is not registered in the target device list 219(a) for the host computer 1A. Hence the host computer 1A is unable to access the target device identified by WWN=0, internal LUN=4. By having the storage system 2 specify the target device to be accessed using the access-permitted host list 219 in this manner, access to a target device from a host computer can be permitted or denied in accordance with the access authority of each host computer to access the target devices. More specifically, when an access request is received from the host computer 1 requesting access to a target device which the host computer is not permitted to access, the storage system 2 returns an error to the host computer or does not respond to the request, and is thus able to prohibit access to the target device.

The target device-LDEV mapping information 214 shows the LDEVs that are currently allocated to the target devices. FIG. 5 shows an example of the target device-LDEV mapping information 214 relating to the target device identified by WWN=0, internal LUN=0, but in actuality, one set of target device-LDEV mapping information 214 is stored in the memory 204 of the storage system 2 for each target device.

The target device-LDEV mapping information is constituted by a pointer 1100 for pointing to an entry in the in-storage system target device list 219(b) identifying a target device, an LDEV number 1101 which serves as identification information for the LDEV which corresponds to the target device (that is, the path-defined LDEV), the condition 1102 of the target device, the capacity 1103 of the LDEV corresponding to the target device, and a pointer 1104 for pointing to an entry in the juke box information 217.

The condition 1102 comprises information such as defined/undefined, normal, blocked, whether the target device is a command device implemented as a juke box system, and so on.

FIG. 6 is a view showing an example of the juke box information 217.

The juke box information 217 exists for each LDEV that can be allocated (or in other words path-defined) to each target device. Accordingly, when the storage system 2 is at a maximum, the juke box information 217 is provided in a number obtained by multiplying the maximum number of LDEVs that can be path-defined to each target device by the maximum number of implemented target devices. Note that the juke box information 217 maybe provided in a queue configuration or the like depending on the capacity limitations and so on of the control memory, but since this bears no direct relationship to the essence of the present invention, detailed description is not provided. It goes without saying that other table configurations are possible as long as all of the LDEVs to be used in the juke box can be registered for each target device to which the juke box function is applied.

Note that FIG. 6 shows the juke box information 217 for a single LDEV that can be path-defined to a certain single target device.

A set 1200 comprising a port ID (WWN) and an internal LUN for identifying a target device, an LDEV number 1201 for identifying an LDEV that may be allocated to the target device, a path defining time 1202 indicating the time at which the LDEV is allocated to the target device, a path detachment time 1203 indicating the time at which the allocation of the LDEV to the target device is to be detached, a latest access path defining time 1204 indicating the time at which the LDEV was allocated to the target device last, and a latest access path detachment time 1205 indicating the time at which the latest allocation of the LDEV to the target device is detached are registered in the juke box information 217.

Note that the pointer 1104 for pointing to an entry in the juke box information, which is included in the target device-LDEV mapping information 214 described above, indicates the top address of the juke box information 217 of the corresponding target device.

FIG. 7 is a view showing an example of the LDEV information 216. Although FIG. 7 shows the LDEV information 216 of a single LDEV, the storage system 2 comprises the LDEV information 216 for the maximum number of implemented LDEVs.

The LDEV information comprises an LDEV number 1000 serving as an LDEV identification number, an LDEV condition 1001, a path definition 1002 indicating whether or not the LDEV is path-defined, program usage information 1003, program reservation information 1004, juke box information 1005, an LDEV capacity 1006, an LDEV emulation type 1007, an LDEV attribute 1008, an attribute setting time 1009 indicating the time at which the attribute is set, and an attribute modification prohibition period 1010 indicating a period (from the attribute setting time 1009) during which modification of the attribute is prohibited.

The LDEV condition 1001 contains information such as whether the device is implemented (defined), whether it is in a normal condition or a blocked condition, whether or not it is serving as a juke box system (i.e. whether the LDEV constitutes a command device serving as a juke box system as a result of being allocated to a target device), and so on.

In the path definition 1002, if the LDEV is path-defined, a set of a port ID (WWN) and an internal LUN is registered as the identification information of the target device to which the LDEV is allocated, and if the LDEV is not path-defined, a null is registered.

The program usage information 1003 indicates whether or not the LDEV is being used in a program operated in the interior of the storage system 2 (whether or not the LDEV is being used as a juke box system, and whether or not the LDEV is being used in a program not directly related to the present invention (for example, a program for executing processing in the interior of the storage system to create a replica of the data in the LDEV in another LDEV, a program for executing processing to copy the data in the LDEV to an LDEV in another storage system, and so on)), and the program reservation information 1004 indicates whether or not the LDEV is reserved as an LDEV for use in a program operated in the interior of the storage system 2.

The juke box information 1005 is a pointer for pointing to the juke box information 217 relating to the LDEV.

The emulation type 1007 is information indicating the emulation type of the devices to and from which input and output is possible from the host computer 1, and comprises information such as whether the emulation type is for an open system host computer, a mainframe host computer, and so on.

The attribute 1008 is information indicating the attribute of the LDEV. Examples of attributes include a read only attribute indicating that writing to the LDEV is prohibited, a read/write attribute permitting both reading of and writing to the LDEV, a protect attribute prohibiting all processing on the LDEV, and an SVOL-disable attribute prohibiting use of the LDEV as an LDEV for storing a replica of data stored on another LDEV. Identification information (for example, the WWN of the host computer 1) for the host computers that are permitted to access the LDEV may also be registered as the attribute 1008.

Note that as the configuration information 218, the storage system 2 comprises the LDEV-PDEV mapping information 215 in addition to the information illustrated in FIGS. 5 through 7. However, as noted above, the LDEV-PDEV mapping information 215 is information indicating the relationship between the PDEVs and LDEVs, and is not described in detail here.

(6) Definition Processing for a Command Device Serving as the Juke Box System 6

FIG. 8 is a view showing an example of definition processing for a command device serving as the juke box system 6, which is executed by the storage system management program 413 of the management device 3 and the configuration control program 210 of the storage system 2. A user of the juke box system may set the juke box system 6 in the storage system 2 via the storage system management program 413 of the management device 3.

The user activates the storage system management program 413, whereupon the storage system management program 413 transmits a configuration information acquisition command to the configuration control program 210 of the storage system 2 in order to search the configuration information 218 of the storage system 2 (step 501). Note that the user is able to instruct the storage system management program 413 by connecting to the storage system management server program 414 from the host computer 1 via the second communication path 13, and is also able to instruct the storage system management program 413 using the display device 404 and input device 405 of the management device 3. The configuration information acquisition command is received by the storage system 2 via the second communication path 13.

Having received the configuration information acquisition command (step 502), the configuration control program 210 transmits the configuration information 218 of the storage system 2 to the management device 3 (step 503).

Having received the configuration information (step 504), the storage system management program 413 outputs the received configuration information to the display device 404, or transmits the configuration information to the host computer 1 used by the user via the storage system management server program 414 and second communication path 13.

The user refers to the path definition 1002 of the LDEV information 216 in the configuration information output by the management device 3 to search the storage system 2 for an LDEV which is not path-defined. The user then inputs an instruction to set the found LDEV as a juke box system, specifying the LDEV number of the LDEV. On the basis of this instruction, the storage system management program 413 creates definition information indicating that the LDEV denoted by the number of the received LDEV is set as the juke box system 6 (that is, the target device to which the LDEV corresponds is set as a command device for the juke box system 6) (step 505). Note that specification of the LDEV to become the juke box system may be performed automatically by having the storage system management program 413 search the path definition 1002 in the LDEV information 216, rather than by means of an instruction given by the user.

The storage system management program 413 also transmits a configuration information update command to the configuration control program 210 via the second communication path 13 (step 506).

Having received the configuration information update command (step 507), the configuration control program 210 transmits a configuration information update preparation completion response indicating reception of this command to the storage system management program 413 (step 508).

Having received the response (step 509), the storage system management program 413 transmits the definition information created in step 505 to the configuration control program 210 via the second communication path 13 (step 510).

Having received the definition information (step 511), the configuration control program 210 updates the configuration information according to the received definition information, thereby defining the LDEV indicated by the LDEV number specified by the storage system management program 413 as the juke box system 6. More specifically, information indicating a jukebox system is stored in the condition 1001 of the LDEV information 216 for the LDEV number specified by the definition information, and the identification information (port ID (WWN) and internal LUN) of the target device used as the command device is stored in the path definition information. Further, the configuration control program 210 updates the target device-LDEV mapping information 214 on the basis of the received definition information, and relates the command device to the LDEV specified by the definition information. The configuration control program 210 also updates the juke box information 217 relating to the LDEV and command device specified by the definition information. The configuration control program 210 then transmits a configuration information update completion report to the storage system management program 413 (step 512).

Having received the configuration information update completion report (step 513), the storage system management program 413 outputs an update completion report to the user, whereupon a state of standby is entered to await confirmation of the end of processing. When an end instruction is input into the management device 3 by the user, the storage system management program 413 ends the processing (step 514).

(7) Processing for Obtaining the Configuration Information 218 from the Host Computer 1

Figure 9:
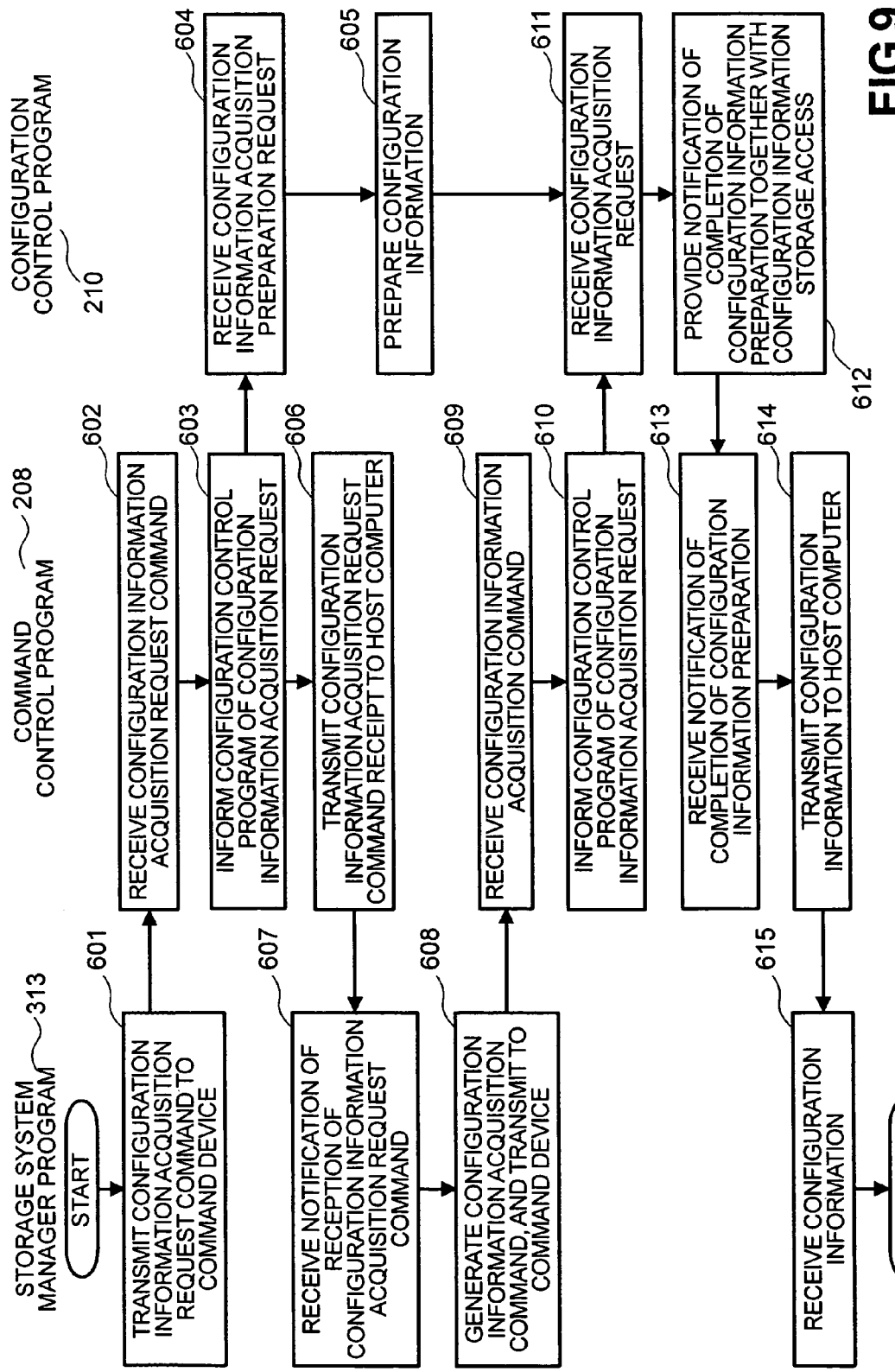
FIG. 9 is a view showing an example of processing for obtaining storage system configuration information from the host computer.

FIG. 9 is a view showing an example of a processing procedure implemented when acquiring the configuration information 218 of the storage system 2 from the host computer 1.

The host computer 1 using the storage system 2 uses the storage system manager program 313 to issue a configuration information acquisition request command to the juke box system 6 that has become usable as a result of the setting processing shown in FIG. 8, and is thus able to obtain the configuration information 218 of the storage system 2. By obtaining the configuration information 218 of the storage system 2, the host computer is able to confirm the target devices to which the juke box function can be applied and the LDEVs that have been newly allocated to the target devices using the juke box function.

The user activates the storage system manager program 313 on the host computer 1, whereupon the storage system manager program 313 transmits a configuration information acquisition request command for searching the configuration information of the storage system 2 with the juke box system 6 of the storage system 2 as the target device (or in other words, with the command device in which the juke box system 6 is implemented as the target device) (step 601).

Having received the configuration information acquisition request command over the first communication path 12 (step 602), the storage system controller 201 processes the configuration information acquisition request command received by the command control program 208 in a similar manner to the input/output processing performed on a normal target device. In other words, the command control program 208 interprets the content of the received command, determines that the command is a configuration information acquisition request command, and transmits a configuration information acquisition preparation request to the configuration control program 210 (step 603). The command control program 208 also transmits a response indicating reception of the configuration information acquisition request command to the storage system manager program 313 of the host computer 1 (step 606).

Having received the response relating to the configuration information acquisition request command (step 607), the storage system manager program 313 transmits a configuration information acquisition command to the juke box system 6 (step 608).

Meanwhile, having received the configuration information acquisition preparation request from the command control program 208 (step 604), the configuration control program 210 prepares the configuration information for transmission to the command control program 210 (step 605). At this time, the configuration control program 210 prepares the LDEV information 216 for the LDEVs that can be allocated to the target devices corresponding to the content of the host computer target device list 219(*a*) for the host computer 1 which issued the configuration information acquisition request command, and the set comprising the WWN and LUN recorded in this host computer target device list 219(*a*), and the juke box information 217 relating to these target devices. This information may be obtained by referring to the access-permitted host list 219, the juke box information 217, and the LDEV information 216.

Having received the configuration information acquisition command over the first communication path 12 (step 609), the command control program 208 of the storage system controller 201 analyzes the received command, interprets the command to be a configuration information acquisition command, and transmits a configuration information acquisition request to the configuration control program 210 (step 610).

Having received the configuration information acquisition request (step 611), the configuration control program 210 informs the command control program 208 of the memory address at which the configuration information prepared in step 605 is stored and the size of the prepared configuration information, and transmits a configuration information preparation completion report to the command control program (step 612).

Having received the configuration information preparation completion report from the configuration control program 210 (step 613), the command control program 208 reads the configuration information from the memory region indicated by the memory address notified by the configuration control program 210, and transmits the configuration information to the host computer 1 (step 614).

Having obtained the configuration information from the command control program 208 (step 615), the storage system manager program 313 of the host computer 1 displays the configuration information to the user on the display device 304, and then ends configuration information acquisition processing.

Figure 19:
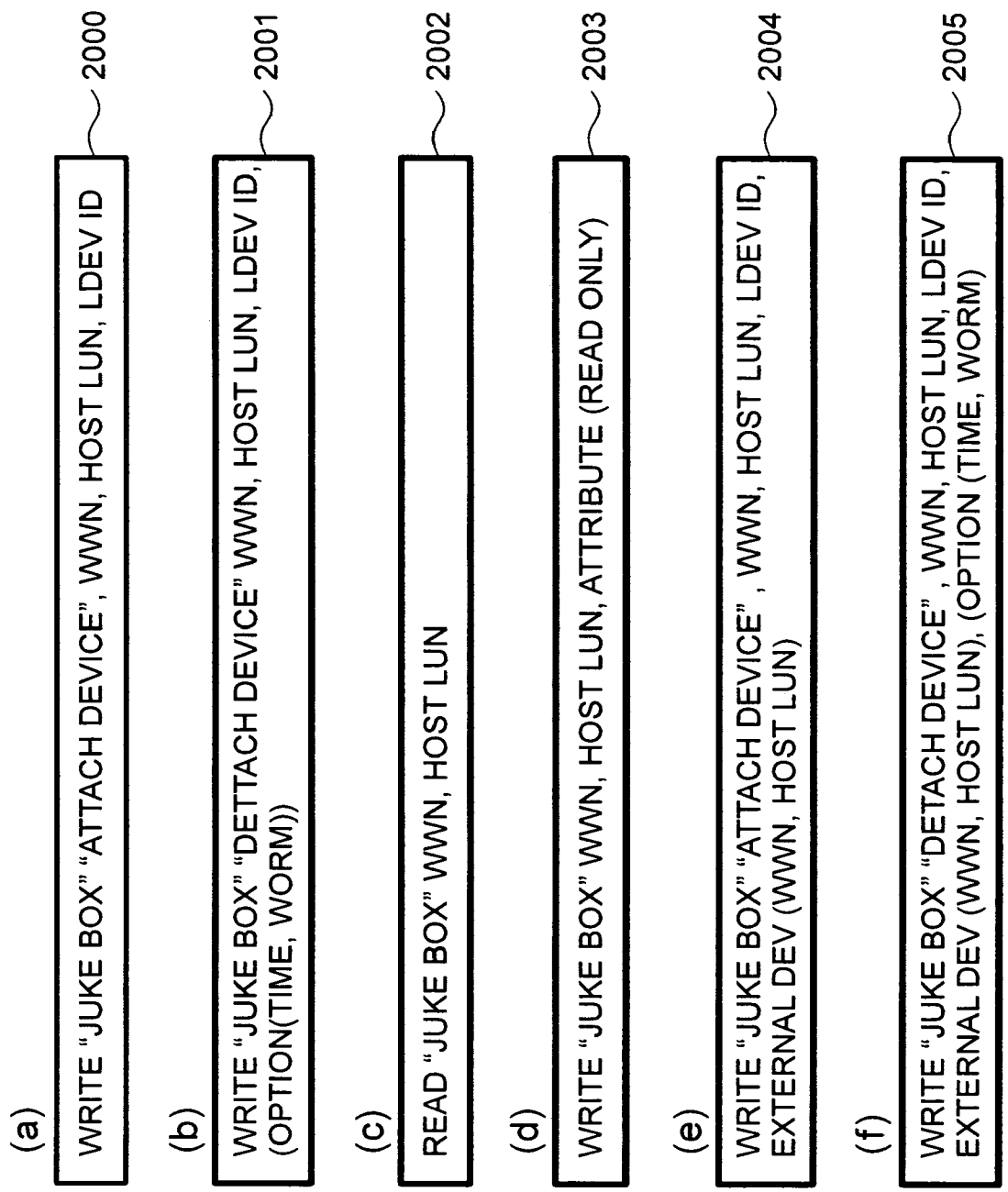
FIG. 19 is a view showing an example of a command issued by the host computer to a command device constituting a juke box system.

FIG. 19 is a view showing examples of commands issued by the host computer 1 to the storage system 2. Note that identification information identifying the host computer 1 (for example, the WWN of the host computer 1), which is the source of the command, is included in the commands shown in FIG. 19, although not illustrated in FIG. 19 itself. The various commands issued by the host computer 1 to the juke box system (command device) take a read command or write command format to or from the command device, as shown in FIG. 19.

FIG. 19C shows an example of a configuration information acquisition request command 2002 issued by the storage system manager program 313 in step 601. This command takes a read command format. The command comprises "JUKE BOX", indicating that the command is addressed to the command device constituting the juke box system, and a port ID (WWN) and host LUN for identifying a certain target device that can be accessed from the host computer 1.

When the identification information of the target device (port ID (WWN) and host LUN) is specified in the configuration information acquisition request command, as shown in FIG. 19C, in step 605 the configuration control program 210 prepares the LDEV information 216 for the LDEVs that can be accessed from the target device that is specified by the set of the port ID (WWN) and host LUN in the configuration information acquisition request command 2002 and the identification information of the host computer, and the juke box information 217 relating to the target device.

Note that identification information for the target device need not be included in the configuration information acquisition request command 2002. In such a case, as described in step 605 of FIG. 9, a list of the target devices that can be accessed from the host computer which is the issuing source of the configuration information acquisition request command 2002, the juke box information 217 relating to each of the target devices included in the list, and the LDEV information 216 of the LDEVs that can be allocated to each of the target devices is prepared by the configuration control program 210.

(8) LDEV Detachment Processing

Figure 10:
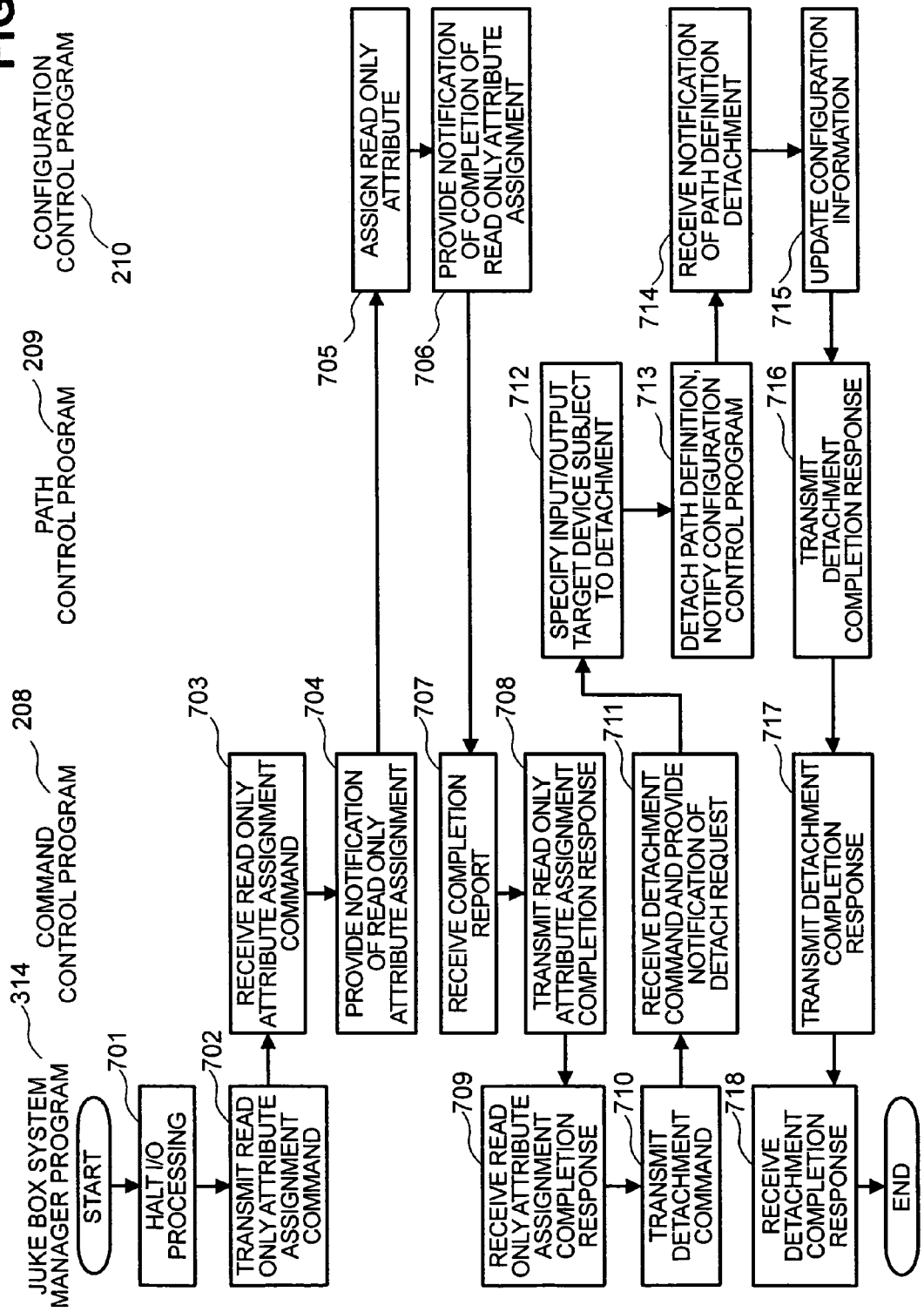
FIG. 10 is a view showing an example of detachment processing.

FIG. 10 is a view showing an example of detachment processing for detaching a path definition to a target device by disengaging the LDEV allocation to the target device.

The host computer 1 uses the configuration information 218 obtained through the processing shown in FIG. 9, which was performed using the storage system manager program 313, to perform processing to substitute the LDEV allocated to a target device using the juke box system manager program 314. FIG. 1 illustrates this example. On the basis of a request from the juke box system manager 5 of the host computer 1, the juke box system 6 of the storage system 2 substitutes the first LDEV 8 allocated to the target device 7 for the second LDEV 9.

First, LDEV detachment (disengagement) processing will be described using an example of processing to disengage the first LDEV from the target device to which it is allocated.

The juke box system manager program 314 uses the juke box function to halt input/output processing on the first LDEV to be disengaged from the target device (step 701).

The juke box system manager program 314 then halts the input/output processing of the application performing input/output processing on the target device to which the first LDEV is allocated, and at the same time transmits a write command to the storage system to ensure that data which were cached in the memory 302 of the host computer 1 during the input/output processing executed on the target device up to the present, but have not yet been written into the storage system 2, are written into the storage system 2.

This write command is received by the command control program 208 of the storage system 2, whereupon write processing is executed by the disk I/O program 212 (not shown in the drawing).

When the write processing based on the write command is complete, the juke box system manager program 314 transmits to the juke box system 6 (or in other words the command device) a read only attribute assignment command requesting that from now on, only read processing be permitted on the first LDEV to be substituted (step 702). At this time, the juke box system manager program 314 transmits a port ID (WWN) and host LUN to the juke box system 6 to specify the target device to which the first LDEV, which is the object of read only attribute assignment, is allocated.

Having received the read only attribute assignment command (step 703), the command control program 208 interprets the received command, and specifies the identification number of the first LDEV which is the object of read only attribute assignment by referring to the access-permitted host list 219 and the target device-LDEV mapping information 214. The command control program 208 then instructs the configuration control program 210 to assign a read only attribute to the specified first LDEV (step 704).

On the basis of the LDEV number notified in step 704, the configuration control program 210 updates the attribute 1008 of the LDEV information 216 corresponding to the LDEV number to a read only attribute (step 705). The configuration control program 210 then transmits notification of the completion of read only attribute assignment to the command control program 208 (step 706).

Having received this notification of the completion of read only attribute assignment (step 707), the command control program 208 transmits a read only attribute assignment completion response to the host computer 1 (step 708).

Having received the read only attribute assignment completion response (step 709), the juke box system manager program 314 in the host computer transmits an LDEV detach command to the juke box system 6. The detach command specifies a port ID (WWN) and host LUN serving as the identifiers of the target device to which the first LDEV to be substituted is allocated (step 710).

Having received the detach command from the host computer 1, the command control program 208 interprets the command and transmits a detachment request to the path control program 209 (step 711)

The path control program 209 uses the access-permitted host list 219 to specify the port ID (WWN) and internal LUN of the target device which is the subject of the detachment request (step 712). The path control program 209 then checks whether the specified target device is implemented, whether the target device is faulty, whether the host computer 1 which transmitted the detach command is authorized to access the target device, and so on. This information can be confirmed by referring to the target device-LDEV mapping information 214, the access-permitted host list 219, and so on in the configuration information 218.

Following this confirmation processing, the path control program 209 performs path definition detachment. More specifically, the path control program 209 creates definition information to be notified to the configuration control program 210 in order to disengage the first LDEV from the target device. The path control program 209 then notifies the configuration control program 210 of the path definition modification and the created definition information (step 713).

Having received this notification (step 714), the configuration control program 210 deletes the target device-LDEV mapping information 214 relating the target device to the detached first LDEV on the basis of the definition information. The configuration control program 210 also updates the LDEV information 216 of the first LDEV, and registers a null in the path definition 1002. The configuration control program 210 also updates the jukebox information 217, registers the current time in the latest access path detachment time 1205, and registers the time that is registered in the path definition time 1202 in the latest access path definition time 1204. The configuration control program 210 then transmits a completion report to the path control program 209 (step 715).

Having received the completion report from the configuration control program 210, the path control program 209 transmits an LDEV detachment completion response to the command control program 208 (step 716). Having detected the detachment completion response, the command control program 208 transmits a detachment completion response corresponding to the detach command received in step 710 to the host computer 1 (step 717).

Having received the detachment completion response (step 718), the juke box system manager program 314 outputs completion information to the display device 304, and then ends detachment processing.

Note that the reason for changing the attribute of the first LDEV that is disengaged from the target device to a read only attribute from step 702 to step 709 is that depending on the AP 17 operating on the host computer 1, there may be a desire to change the data in the LDEV that is disengaged from the target device after the end of writing processing to a WORM (write once read many) format to ensure that the data are not manipulated. In a case where the AP 17 is mail software, for example, when November moves into December, the LDEV storing the mail data for November may be disengaged from the target device and a new LDEV for storing mail data for December may be allocated to the target device. By assigning are ad only attribute to the detached LDEV in this case, the mail data for November can be protected from further manipulation. Hence when an LDEV that is disengaged from a target device following writing processing is to be used as a read only archive LDEV, it is preferable that a read only attribute be assigned to the LDEV prior to detachment processing. If, on the other hand, there is a possibility that rewriting processing will be executed on the LDEV that is disengaged from the target device following writing processing in the future, the processing of steps 702 through 709 may be omitted.

Note that in the example in FIG. 10, the LDEV is disengaged from the target device when the detach command is issued from the host computer 1, but the storage system 2 may begin the processing of steps 704 through 707 and steps 711 through 717 automatically when the time recorded in the path detachment time 1203 of the juke box information 217 is reached.

FIG. 19D is a view showing an example of a read only attribute assignment command 2003 issued from the juke box system manager program 314 in step 702. The read only attribute assignment command 2003 comprises "JUKE BOX", identifying the juke box system (command device) of the command destination, a port ID (WWN) and host LUN specifying the target device to which the first LDEV, which is to be assigned with the read only attribute, is allocated (path-defined), and the information "Attribute (Read Only)" indicating that a read only attribute is to be assigned. Note that the read only attribute assignment command 2003 takes a write command format.

FIG. 19B is a view showing an example of a detach command 2001 issued from the juke box system manager program 314 in step 710. The detach command 2001 comprises "JUKE BOX", identifying the juke box system of the command destination, "Detach Device" indicating that the command is a detach command, a set of a port ID (WWN) and host LUN serving as the identification information of the target device to which the LDEV to be detached is path-defined, the LDEV number of the first LDEV to be detached, information indicating that the detachment subject first LDEV may be changed to a WORM format as an option, and information indicating the time period of the WORM format. Note that as long as the target device subject to detachment can be specified, the LDEV number of the LDEV to be detached need not be included in the detach command.

(9) LDEV Attachment Processing

Figure 11:
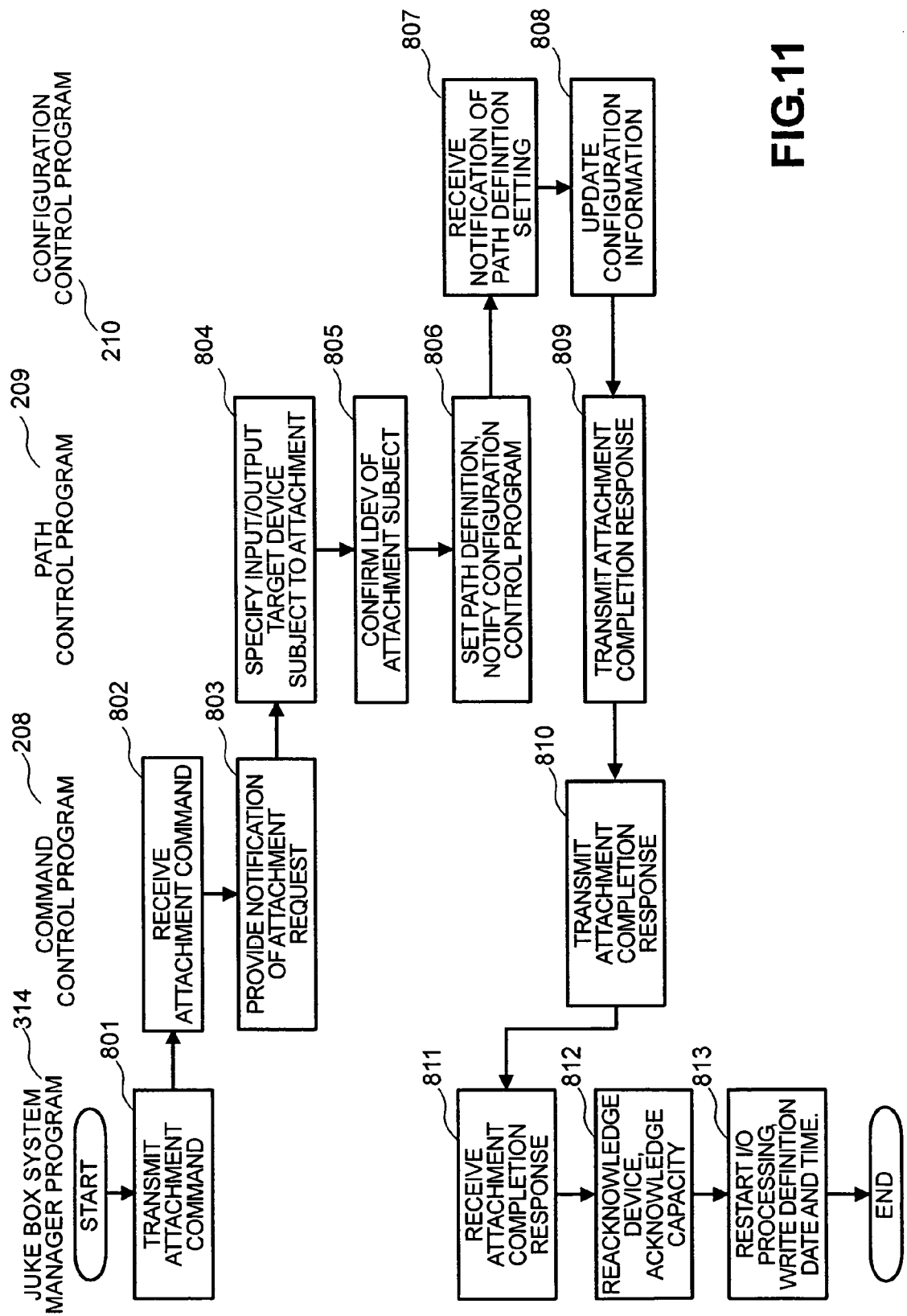
FIG. 11 is a view showing an example of attachment processing.

FIG. 11 is a view showing an example of attachment processing for setting a path definition to a target device by allocating a new LDEV to the target device.

LDEV attachment processing will be described using an example in which, following the processing shown in FIG. 10, the juke box function is used to newly allocate the second LDEV to a target device.

The juke box system manager program 314 transmits to the juke box system 6 (or in other words the command device) of the storage system 2 a command (also referred to as "attach command" hereafter) indicating that the second LDEV is to be newly allocated to a target device (step 801). The attach command comprises identification information (i.e. a port ID (WWN) and host LUN) for the target device that is the subject of the attach command, and the LDEV number of the second LDEV to be newly allocated to the target device.

Having received the attach command (step 802), the command control program 208 analyzes the command to determine that the command relates to input/output processing on the jukebox system 6 and that the content of the command is an attachment request to allocate the second LDEV to the target device, and then transmits an attachment request to the path control program 209 requesting that the second LDEV be path-defined to the target device (step 803).

Having received the attachment request, the path control program 209 specifies the identifiers (i.e. the port ID (WWN) and internal LUN) of the target device that is the subject of the received attachment request on the basis of the attachment request (step 804). This processing may be performed by referring to the access-permitted host list 219. The path control program 209 also checks whether an LDEV is path defined to the specified target device. This processing may be performed by referring to the configuration information 218, and in particular the target device-LDEV mapping information 214.

Next, the path control program 209 checks the second LDEV to be allocated to the target device (step 805). More specifically, the path control program 209 confirms that the LDEV is normal (not faulty), the LDEV is not allocated to other processing, the LDEV is not reserved for other processing, the LDEV is not path defined, the LDEV has not been allocated to the target device by the juke box system up to the present, and so on. This information can be confirmed by referring to the condition 1001, program usage information 1003, program reservation information 1004, and path definition 1002 in the LDEV information 216 of the second LDEV, and the latest access path definition time 1204 in the juke box information 217.

Next, the path control program 209 allocates the second LDEV to the target device specified by the attach command, and path-defines the second LDEV to the target device. In other words, the path control program 209 creates definition information for allocating the second LDEV to the target device. The path control program 209 then transmits notification of the new path definition to the configuration control program 210 together with the definition information (step 806).

Having received this notification (step 807), the configuration control program 210 rewrites the target device-LDEV mapping information 214 on the basis of the received definition information such that the second LDEV is allocated to the target device that is the subject of attachment. The configuration control program 210 also modifies the LDEV information 216 relating to the second LDEV, and records the port ID (WWN) and internal LUN serving as the identification information of the target device to which the second LDEV is allocated in the path definition 1002. Further, the configuration control program 210 updates the juke box information 217, and records the current time in the path definition time 1202 and the estimated disengagement time of this path setting in the path detachment time (step 808).

The configuration control program 210 then notifies the path control program 209 that update processing of the configuration information 218 is complete, and upon reception of this notification, the path control program 209 transmits an attachment completion response to the command control program 208 (step 809).

Having detected the attachment completion response, the command control program 208 transmits to the host computer 1 an attachment processing completion response which serves as a response to the attach command received in step 802 (step 810).

Having received the attachment processing completion response from the storage system 2 (step 811), the juke box system manager program 314 reacknowledges the target device, and if the capacity of the device has changed, detects this change and confirms the capacity of the new second LDEV (step 812).

The juke box system manager program 314 then allows I/O processing to recommence on the target device, writes the identification information of the target device, the identification information of the host computer 1 (or the juke box system manager 5), and the date and time at which the path definition was set in a specific region of the newly allocated LDEV (step 813), and then ends the processing.

By means of the above, attachment processing can be performed to allocate the new second LDEV to the target device. When the host computer 1 places an access request (a read or write request) for access to the target device to which the second LDEV is newly path defined after the end of this attachment processing, the storage system 2 executes access processing on the second LDEV on the basis of the updated target device-LDEV mapping information 214.

FIG. 19A is a view showing an example of an attach command 2000 issued in step 801. The attach command 2000 comprises "JUKE BOX" indicating the destination of the command, "Attach Device" indicating that the command is an attach command, a set of the WWN and host LUN serving as the identification information of the target device that is subject to attachment, and an LDEV number for identifying the LDEV to be attached.

Figure 12:
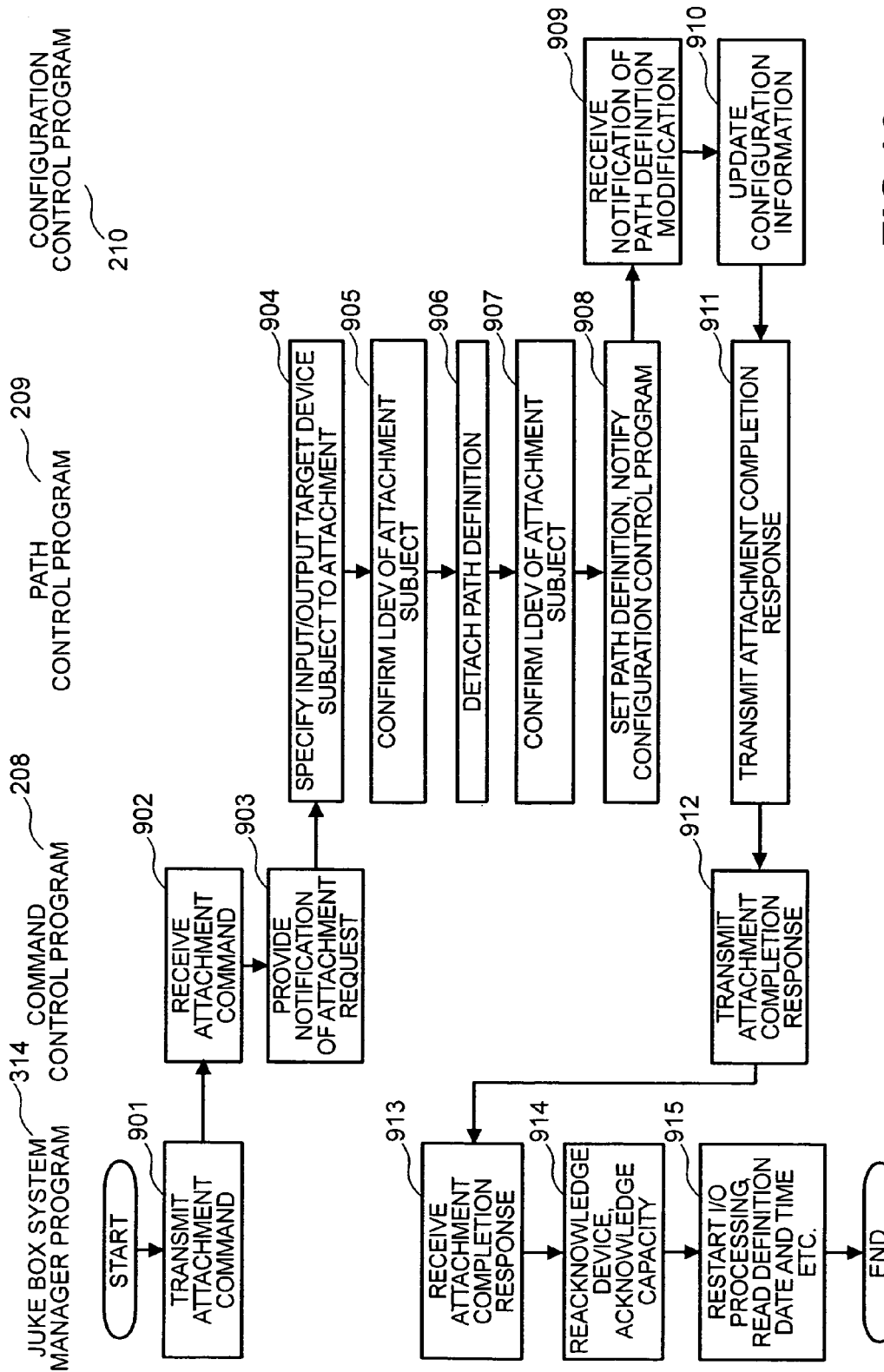
FIG. 12 is a view showing an example of reattachment processing.

(10) Reattachment Processing for an LDEV that has been Path Defined to a Target Device in the Past FIG. 12 shows an example of processing to reattach an LDEV to a target device after being path defined to the target device in the past and then detached therefrom.

Note that the attachment processing shown in FIG. 11 is performed to allocate a new LDEV to a target device, whereas the reattachment processing shown in FIG. 12 is performed to reattach an LDEV to a target device after having been allocated to the target device once in the past and then disengaged therefrom.

Moreover, in cases where the second LDEV is to be path defined to a target device to which the first LDEV is path defined in place of the first LDEV, in FIGS. 10 and 11 the host computer 1 first issues a detach command relating to the first LDEV, then executes detachment processing on the storage system 2, then issues an attach command relating to the second LDEV, and then executes attachment processing on the storage system 2. In the processing shown in FIG. 12, however, detachment processing for the first LDEV and attachment processing for the second LDEV are executed in the storage system 2 simply by having the host computer 1 issue a single attach command for the second LDEV.

Note that as long as the processing flow shown in FIG. 12 is followed, detachment processing and attachment processing may be executed in the storage system 2 as a series of processes based on a single attach command regardless of whether the LDEV to be attached is a new LDEV or an LDEV that has been attached to a target device once before.

The juke box system manager program 314 transmits to the jukebox system 6 (or in other words the command device) an attach command specifying a port ID (WWN) and host LUN set serving as the identification information of the target device subject to processing, and an LDEV number serving as the identification number of the LDEV to be reattached to the target device (step 901). Note that at this time, the attach command transmitted by the juke box system manager program 314 takes the same format as the attach command 2000 shown in FIG. 19A.

Having received the attach command (step 902), the command control program 208 transmits an attachment request to the path control program (step 903).

The path control program 209 specifies a port ID (WWN) and internal LUN set serving as the identification information of the target device that is subject to processing, and determines whether an LDEV is already allocated to the target device by referring to the target device-LDEV mapping information 214 (step 904). At this time, similarly to step 712 in FIG. 10, the path control program 209 checks whether the specified target device is implemented, whether the target device is faulty, whether the host computer 1 which transmitted the attach command is authorized to access the target device, and so on.

The path control program 209 also confirms the LDEV number of the LDEV that is currently attached to the target device that is subject to processing (step 905). Then, similarly to step 713 in FIG. 10, the path control program 209 creates definition information to disengage the LDEV specified in step 905 from the target device specified in step 904 (step 906).

Next, on the basis of the-attach command received from the host computer, the path control program 209 confirms the LDEV number of the LDEV to be path defined to the target device specified in step 904 (step 907), and checks that the LDEV to be attached is normal (not faulty), the LDEV is not allocated to other processing, the LDEV is not reserved for other processing, the LDEV is not path defined, and so on.

Next, similarly to step 806 in FIG. 11, the path control program 209 creates definition information to path define the LDEV specified in step 907 to the target device specified in step 904. The path control program 209 then transmits notification that the path definition for the target device specified in step 904 has been modified (i.e. that the LDEV has been substituted) to the configuration control program 210 together with the definition created in step 906 and step 908 (step 908).

Having received notification of the path definition modification (step 909), the configuration control program 210 updates the target device-LDEV mapping information 214, LDEV information 216, and juke box information in accordance with the received definition information (step 910). More specifically, the target device-LDEV mapping information 214 is updated to relate the LDEV specified in step 907 to the target device specified in step 904. Further, the LDEV information 216 for the detached LDEV specified in step 905 is updated such that a null is inserted in the path definition 1002 of this LDEV, and in the juke box information 217 relating to this LDEV, the time recorded in the path definition time 1202 is registered in the latest access path definition time 1204, and the current time is registered in the latest access path detachment time 1205. Further, the LDEV information 216 for the attached LDEV specified in step 907 is updated such that the port ID (WWN) and internal LUN set specified in step 904 is recorded in the path definition 1002 of this LDEV, and in the juke box information 217 relating to this LDEV, the current time is recorded in the path definition time 1202, and the estimated future time at which the LDEV is to be disengaged from the target device is recorded in the path detachment time 1203. The configuration control program 210 then notifies the path control program 209 that modification processing of the configuration information is complete.

Having received this completion notification from the configuration control program 210, the path control program 209 transmits an attachment completion response to the command control program 208 (step 911).

Having received the attachment completion response from the path control program 209, the command control program 208 transmits to the host computer 1 an attachment completion response which serves as a response to the attach command received in step 902 (step 912).

Having received the attachment completion response (step 913), similarly to step 812 in FIG. 11, the jukebox system manager program 314 of the host computer 1 reacknowledges the target device subject to processing and confirms the modified capacity of the device (step 914). The juke box system manager program 314 also allows I/O processing to recommence on the target device, reads the identification information of the target device, the identification information of the host computer (or the juke box system manager 5), and the date and time of path definition, which are recorded in a specific region of the reattached LDEV, to confirm that the reattached LDEV is definitely the LDEV for which reattachment was requested by the juke box system manager program 314 in step 901 (step 915), and then ends the processing.

Note that the identification information of the target device, the identification information of the host computer (or the juke box system manager 5), and the date and time of path definition, which are read from a specific region of the LDEV in step 915, correspond to the information that was written into the specific region of the LDEV when the LDEV was first attached in step 813 of FIG. 11. The host computer 1 stores the information that is written into the LDEV in step 813 of FIG. 11, and hence when the LDEV is reattached in step 915, this information can be checked to confirm that the attached LDEV is the intended LDEV.

By means of this processing, an LDEV that was attached to a target device once before and then detached therefrom can be reattached to the target device and accessed.

Also by means of this processing, an LDEV that is attached to a target device can be exchanged by issuing a single attach command from the host computer 1.

According to the first embodiment described above, an LDEV corresponding to a target device can be altered from a host computer. Hence the host computer can access a plurality of LDEVs using a single target device. As a result, situations in which an LDEV that is rarely accessed remains allocated to the target device, causing a decrease in the usability of the storage system, can be prevented.

Moreover, a read only attribute is attached to an LDEV that is no longer allocated to the target device such that writing to this LDEV is prohibited by the storage system controller, and hence the data stored in the LDEV can be protected from manipulation.

[Second Embodiment]

(1) System Constitution

Figure 13:
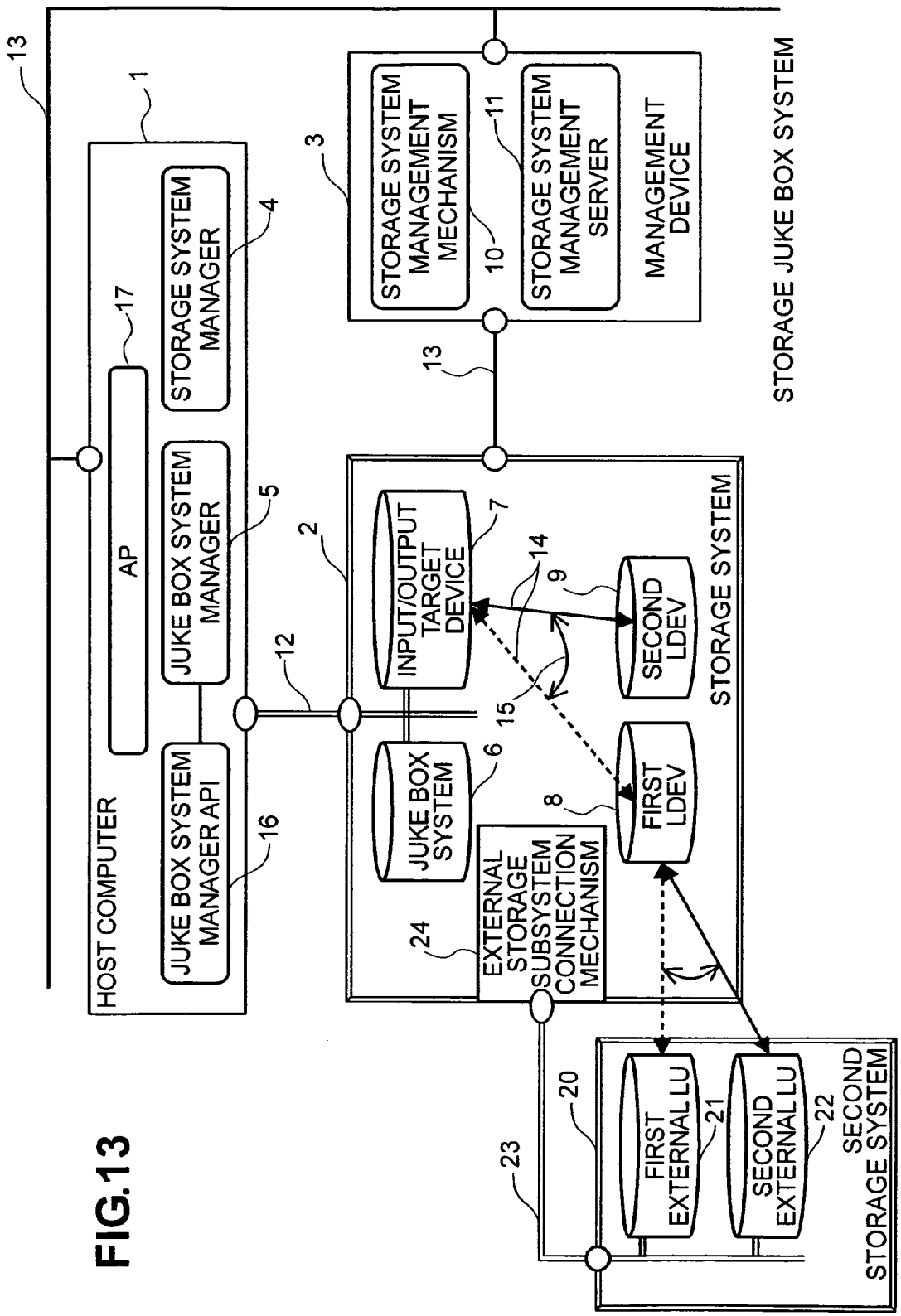
FIG. 13 is a view showing an example of a system configuration in a second embodiment.

FIG. 13 is a view showing an example of the system constitution in a second embodiment.

The system constitution of the second embodiment differs from the system constitution of the first embodiment in that the storage system 2 comprises an external storage connection mechanism 24, and the storage system 2 is connected to another storage system (second storage system) 20 via this external storage connection mechanism 24. Otherwise, the system constitution of the second embodiment is identical to that of the first embodiment.

The external storage connection mechanism 24 connects to the second storage system 20 in order to execute processing to provide the host computer 1 with the target devices of the second storage system 20 (the target devices of the second storage system 20 will also be referred to as LUs (logical units) hereafter) as the LDEVs of the storage system 2. More specifically, when the host computer 1 issues an I/O request to a target device attached with an LDEV of the storage system 2, the external storage connection mechanism 24 specifies a LU of the second storage system 20 which corresponds to the LDEV attached to the target device that is the subject of the I/O request, generates an I/O request addressed to this LU (in other words, an I/O request specifying the WWN and host LUN of the LU), and issues the request to the second storage system 20. In so doing, the external storage connection mechanism 24 transfers the I/O request from the host computer 1 to the second storage system 20 while concealing the existence of the second storage system 20 from the host computer 1.

The juke box system 6 in the second embodiment not only executes processing to exchange the LDEVs allocated to the target device 7 of the storage system 2, but also executes processing to exchange the LUS of the second storage system 20 corresponding to the LDEVs of the storage system 2.

(2) Storage System

FIG. 14 is a view showing an example of the constitution of the storage system 2 in the second embodiment.

The second embodiment differs from the first embodiment in that the storage system 2 comprises an external storage subsystem adapter 2302 serving as an adapter for connecting to the second storage system 20, an external storage subsystem connection program 2301 for executing processing to transmit an I/O request to the second storage system 20 on the basis of an I/O request received from the host computer 1, and external storage subsystem information 2303, which is information relating to the LUs of the second storage system 20, which correspond to the LDEVs in the storage system 2. Otherwise, the constitution of the storage system 2 of the second embodiment is identical to that of the first embodiment.

Note that the constitutions of the host computer 1 and management device 3 are identical to those of the first embodiment.

The second storage system 20 is constituted similarly to the storage system 2 in the first embodiment. Note, however, that the second storage system 20 need not comprise the juke box system 6, and hence in this case, the second storage system 20 need not comprise the juke box information 217. In the second embodiment, the host adapter of the second storage system 20 and the external storage subsystem adapter 2302 of the storage system 2 are connected via a network.

(3) Configuration Information 218

The configuration information 218 provided in the storage system 2 in the second embodiment is similar to that of the first embodiment except for the LDEV information 216 and external storage subsystem information 2303.

The LDEV information 216 in the second embodiment comprises a pointer 1011 to the external storage subsystem information in addition to the LDEV information 216 of the first embodiment shown in FIG. 7. When a LU of the second storage system 20 is allocated to the LDEV indicated by the LDEV information, the storage position in the memory 204 of the external storage subsystem information 2303 relating to this LU is registered in the section for the pointer 1011 to the external storage subsystem information. When no LU of the second storage system 20 is allocated to the LDEV, a null value is registered.

FIG. 15 is a view showing an example of the external storage subsystem information 2303. The external storage subsystem information 2303 shown in FIG. 15 relates to a LU of the second storage system 20 which is capable of being the destination of an I/O request issued by the external storage connection mechanism 24 of the storage system 2 on the basis of an I/O request from the host computer 1. In actuality, the storage system 2 comprises the external storage subsystem information 2303 for the maximum number of LUs of the second storage system 20 that can be supported by the storage system 2.

An ID 1900 of the external storage subsystem LU serves as identification information for identifying a LU of the second storage system 20. More specifically, the ID 1900 is a set comprising a port ID (WWN) and host LUN of the second storage system 20 for identifying the LU. A usage port number 1901 is the port ID (in other words, the identification number of a port provided in the storage system 2) of the target device in the storage system 2 to which the LDEV of the storage system 2 corresponding to the LU is path defined. A LINK condition 1901 is information indicating whether the LINK between the LU and the port of the storage system 2 is ON or OFF.

A capacity 1902 is the capacity of the LDEV of the second storage system 20 which is allocated to the LU. A mapping destination LDEV number 1903 is the identification number of the LDEV in the storage system 2 to which the LU corresponds. A device condition 1904 is information expressing the device condition of the LU, in which Not Ready is registered to indicate that the LU is not path defined, Blockade is registered to indicate a blocked condition, Formatting is registered to indicate that formatting is underway, Normal is registered to indicate a normal condition, and so on, for example.

A connection definition setting time 1905 is information indicating the time at which the LU is allocated to the LDEV of the storage system 2 specified by the mapping destination LDEV number 1903. A connection definition detachment setting time 1906 is information indicating the estimated time at which the relationship between the LU and the LDEV specified by the mapping destination LDEV number 1903 is to be detached. A latest connection definition setting time 1907 is information indicating the time at which the LU was previously allocated to an LDEV of the storage system 2, and a latest connection definition detachment time 1908 is information indicating the time at which a previous relationship between the LU and the LDEV of the storage system 2 was detached. A previous mapping LDEV number 1912 is the LDEV number of the LDEV of the storage system 2 to which the LU was previously allocated, and a previous connection port number 1913 is the port ID (that is, identification information for a port of the storage system 2) of the port in the storage system 2 which was used when the LU was previously allocated to the LDEV of the storage system 2.

An attribute 1909 is the attribute of the LDEV of the second storage system 20 that is path defined to the LU, and similarly to the attribute 1008 in the LDEV information 216 shown in FIG. 7, attribute types include read/write, read only, protect, SVOL-disable, and so on. An attribute setting time 1910 is information indicating the time at which the attribute 1909 is set, and an attribute modification prohibition period 1911 is information indicating a time period from the attribute setting time 1910 during which modification of the attribute set in the attribute 1909 section is prohibited.

(4) Processing to Obtain the Configuration Information 218 from the Host Computer 1

In the second embodiment, processing to obtain the configuration information 218 through the host computer 1 is similar to the processing of the first embodiment shown in FIG. 9. Note, however, that in step 605, the information prepared by the configuration control program 210 further comprises the external storage subsystem information 2303 relating to the LUs of the second storage system 20 that may be allocated to LDEVs which may be attached to a target device that is accessible from the host computer.

(5) Detachment Processing

The host computer 1 is capable of using the configuration information 218 obtained by the processing shown in FIG. 9, which was performed using the storage system manager program 313, to exchange a LU of the second storage system 20 corresponding to an LDEV using the juke box system manager program 314.

FIG. 13 shows an example of this processing in which the juke box system 6 is capable of relating a second external LU 22 of the second storage system to the first LDEV 8, which is path defined to the target device 7, in place of a first external LU 21 of the second storage system corresponding to the first LDEV 8.

First, detachment processing will be described using an example of a case in which the allocation of the first external LU 21 to the first LDEV is disengaged.

FIG. 16 is a view showing an example of detachment processing for disengaging a LU of the second storage system 20, which is allocated to an LDEV that is path defined to the target device of the storage system 2, from the storage system 2.

The juke box system manager program 314 halts input/output processing on the first LDEV (step 1601). More specifically, the juke box system manager program 314 halts the input/output processing of the application which performs input/output processing on the target device to which the first LDEV is allocated, and at the same time transmits a write command to the storage system to ensure that data which have been cached in the memory 302 of the host computer 1 during the input/output processing executed on the target device up to the present, but have not yet been written into the storage system 2, are written into the storage system 2.

This write command is received by the command control program 208 of the storage system 2, whereupon write processing is executed by the external storage subsystem connection program 2301 to write these data into the first LU of the second storage system 20 which is allocated to the first LDEV (not shown in the drawing).

When the write processing based on this write command is complete, the juke box system manager program 314 transmits to the juke box system 6 (or in other words the command device) a read only attribute assignment command requesting that from now on, only read processing be permitted on the first LU (step 1602). Here, the read only attribute assignment command issued by the juke box system manager program 314 takes the format shown in FIG. 19D. In other words, the read only attribute assignment command 2003 comprises a set of a port ID (WWN) and a host LUN of the storage system 2 specifying the target device that is path defined with the first LDEV to which the subject first LU is allocated.

Having received the read only attribute assignment command (step 1603), the command control program 208 interprets the received command, and specifies the identification information (i.e. the port ID (WWN) and host LUN of the storage system 2) of the first LU which is the object of read only attribute assignment by referring to the access-permitted host list 219, the target device-LDEV mapping information 214, the LDEV information 216, and the external storage subsystem information 2303. The command control program 208 then instructs the external storage subsystem connection program 2301 to assign a read only attribute to the specified first LU (step 1604).

On the basis of the WWN and host LUN serving as the identification information notified in step 1604, the external storage subsystem connection program 2301 updates the attribute 1909 of the external storage subsystem information 2303 corresponding to the WWN and host LUN to a read only attribute (step 1605). Further, the current time is set in the attribute setting time 1910, and the period specified by the read only attribute assignment command is set in the attribute modification prohibition period 1911. The external storage subsystem connection program 2301 then transmits notification of the completion of read only attribute assignment to the command control program 208 (step 1606).

Having received this notification of the completion of read only attribute assignment, the command control program 208 transmits a read only attribute assignment completion response to the host computer 1 (step 1607).

Having received the read only attribute assignment completion response (step 1608), the juke box system manager program 314 in the host computer transmits a detach command to the jukebox system 6 (step 1609). The detach command specifies the port ID (WWN) and host LUN set of the storage system 2, which serve as identification information for the target device that is subject to processing, the LDEV number of the first LDEV that is subject to processing, and the port ID (WWN) and host LUN of the second storage system 20, which serve as identification information for the first LU that is subject to processing.

Having received the detach command from the host computer 1, the command control program 208 analyzes the command and transmits a detachment request to the path control program 209 (step 1610).

The path control program 209 uses the access-permitted host list 219 to specify the WWN and internal LUN of the target device which is the subject of the detachment request (step 1611). The path control program 209 then checks whether the specified target device is implemented, whether the target device is faulty, whether the host computer 1 which transmitted the detach command is authorized to access the target device, and so on. This information can be confirmed by referring to the target device-LDEV mapping information 214, the access-permitted host list 219, and so on in the configuration information 218.

The path control program 209 also specifies the first LDEV which is the subject of the detachment request, and confirms that this LDEV is path defined to the target device specified in step 1611 (step 1612).

The path control program 209 also specifies the first LU to be detached by referring to the LDEV information 216 and external storage subsystem information 2303, and confirms that this first LU is allocated to the first LDEV specified in step 1612 (step 1613).

Following this confirmation processing, the path control program 209 creates definition information for disengaging the path definition between the first LDEV and the first LU, and notifies the configuration control program 210 of the disengagement of the path definition together with the created definition information (step 1614).

Having received this notification (step 1615), the configuration control program 210 rewrites the LDEV information 216 relating to the first LDEV, and registers a null in the section for the pointer 1011 to the external storage subsystem information (step 1616). The configuration control program 210 then notifies the path control program 209 that the LDEV information update is complete.

Having received notification of the completion of the LDEV information update from the configuration control program 210 (step 1617), the path control program 209 instructs the external storage subsystem connection program 2301 to disengage the path definition between the first LDEV and the first LU (step 1618).

Having received this instruction from the path control program 209, the external storage subsystem connection program 2301 disengages the path definition between the first LU and first LDEV (step 1619). More specifically, the external storage subsystem connection program 2301 updates the external storage subsystem information 2303 relating to the first LU, sets the LINK condition 1901 to OFF, records the value registered in the connection definition setting time 1905 in the latest connection definition setting time 1907, records the current time in the latest connection definition detachment time 1908, records the LDEV number of the first LDEV, which is registered in the mapping destination LDEV number 1903, in the previous mapping LDEV number 1912, and records the port number registered in the usage port number 1901 in the previous connection port number 1913 (step 1620). The external storage subsystem connection program 2301 then transmits a detachment completion response to the path control program 209.

Having received the detachment completion response from the external storage subsystem connection program 2301, the path control program 209 transmits a detachment completion response to the command control program 208 (step 1621).

Having detected the detachment completion response, the command control program 208 transmits a detachment completion response to the host computer 1 (step 1622).

Having received the detachment completion response (step 1623), the juke box system manager program 314 outputs the completed information to the display device 304, and ends detachment processing.

Note that similarly to the first embodiment, the read only attribute assignment processing from step 1602 to step 1608 may be omitted in certain cases.

Furthermore, in the example in FIG. 16 the first LU is disengaged from the first LDEV when the detach command is issued from the host computer 1, but the processing from step 1604 to step 1607 and from step 1610 to step 1622 may be executed automatically in the storage system 2 when the connection definition detachment setting time 1906 of the external storage subsystem information 2303 is reached.

FIG. 19F is a view showing an example of the detach command that is issued in step 1609. The detach command comprises "JUKE BOX", indicating the juke box system (command device) that is the destination of the command, "Detach Device", indicating that the command is a detach command, a port ID (WWN) and host LUN serving as the identification information of the target device subject to detachment, an LDEV number indicating the first LDEV subject to detachment, a port ID (WWN) and host LUN serving as the identification information of the LU in the second storage system 20 which is attached to the first LDEV, and information indicating that the LU may be set in a WORM format as an option, and specifying the time period for setting the LU in a WORM format. Note that the External Dev ( . . . ) section of the detach command denotes that the detachment subject is a LU of the second storage device 20.

(6) LDEV Attachment Processing

FIG. 17 is a view showing an example of attachment processing for newly allocating the second LU to the first LDEV in order to set a path definition to the second LU of the second storage system 20 from the target device of the storage system 2 via the first LDEV.

Attachment processing will be described using an example in which, following the processing shown in FIG. 16, the juke box function is used to newly allocate the second LU of the second storage system 20 to the first LDEV, which is path-defined to the target device.

The juke box system manager program 314 transmits an attach command to the juke box system 6 of the storage system 2 (in other words to the command device) indicating that the second LU of the second storage system 20 is to be allocated to the first LDEV (step 1701). The attach command comprises identification information (i.e. a set of the port ID (WWN) and host LUN of the storage system 2) for the target device which is the subject of the attach command, the LDEV number of the first LDEV allocated to the target device, and identification information (i.e. a set of a port ID (WWN) and host LUN of the second storage system 20) for the second LU of the second storage system 20 to be newly allocated to the first LDEV.

Having received the attach command, the command control program 208 analyzes the command to determine that the command relates to input/output processing on the juke box system 6 and that the content of the command is an attachment request to allocate the second LU of the second storage system 20 to the first LDEV, and then transmits an attachment request to the path control program 209 requesting that the second LU of the second storage system 20 be allocated to the first LDEV (step 1702).

Having received the attachment request, the path control program 209 specifies the identifiers (i.e. a port ID (WWN) and internal LUN of the storage system 2) of the target device that is the subject of the received attachment request on the basis of the attachment request (step 1703). This processing may be performed by referring to the access-permitted host list 219.

Next, the path control program 209 specifies the first LDEV which is the subject of the attachment request (step 1704). The path control program 209 then confirms that the specified first LDEV is path defined to the target device specified in step 1703, and that the LU of the second storage system 20 is not path defined to the specified LDEV. This processing may be performed by referring to the configuration information 218, and particularly the target device-LDEV mapping information 214 and LDEV information 216.

The path control program 209 also specifies the second LU of the second storage system 20 that is the subject of the attachment request (step 1705). The path control program 209 then confirms that the second LU is in a normal condition (not faulty), the LU is not path defined to the target device of the storage system 2, the LU has not been allocated to the target device by the juke box system up to the present, and so on. This information can be confirmed by referring to the device condition 1904, usage port number/LINK condition 1901, mapping destination LDEV number 1903, and latest connection definition setting time 1907 in the external storage subsystem information 2303.

Next, the path control program 209 creates definition information for allocating the second LU of the second storage system 20 to the first LDEV specified by the attach command, and transmits notification of the path definition to the configuration control program 210 together with the definition information (step 1706).

Having received this notification (step 1707), the configuration control program 210 updates the LDEV information 216 relating to the first LDEV on the basis of the received definition information, and records the storage position in the memory 204 of the external storage subsystem information 2303 relating to the first LU in the pointer 1011 to the external storage subsystem information (step 1708). The configuration control program 210 then notifies the path control program 209 that updating of the LDEV information 216 is complete.

Having received notification of the completion of the LDEV information update from the configuration control program 210 (step 1709), the path control program 209 instructs the external storage subsystem connection program 2301 to path define the second LU of the second storage system 20 to the first LDEV (step 1710).

Having received this instruction, the external storage subsystem connection program 2301 allocates the second LU of the second storage system 20 to the first LDEV (step 1711), and updates the external storage subsystem information 2303 relating to the second LU (step 1712). More specifically, in the external storage subsystem information 2303 relating to the second LU, the port ID (WWN) of the storage system 2 specified in step 1703 is recorded in the usage port number 1901, and the LINK condition 1901 is set to ON. Further, the LDEV number of the first LDEV specified in step 1704 is set in the mapping destination LDEV number 1903, the current time is set in the connection definition setting time 1905, and the time specified in the attach command is set in the connection definition detachment setting time 1906. The external storage subsystem connection program 2301 then notifies the path control program 209 of the completion of attachment.

Having received this notification from the external storage subsystem connection program 2301, the path control program 209 transmits an attachment completion response to the command control program 208 (step 1713), whereupon the command control program 208 transmits an attachment completion response to the host computer 1 (step 1714).

When the host computer 1 receives the attachment completion response (step 1715), the juke box system manager program 314 reacknowledges the target device, and if the capacity of the device has altered, detects this and confirms the capacity of the new second LU. The juke box system manager program 314 then allows I/O processing to recommence on the target device, writes the identification information of the target device, the identification information of the host computer 1 (or the juke box system manager 5), and the date and time at which the path definition was set in a specific region of the newly allocated second LU, and then ends the processing.

By means of the processing described above, attachment processing can be performed to allocate the new second LU to the first LDEV that is attached to the target device of the storage system 2.

FIG. 19E is a view showing an example of the attach command that is issued in step 1701. The attach command comprises "JUKE BOX", indicating the juke box system that is the destination of the command, "Attach Device", indicating that the command is an attach command, a port ID (WWN) and host LUN of the storage system 2 serving as the identification information of the target device subject to attachment, the LDEV number of the first LDEV allocated to the target device, and a port ID (WWN) and host LUN of the second storage system 20 serving as the identification information of the second LU of the second storage system 20 which is to be newly allocated to the first LDEV. Note that the External Dev ( . . . ) section denotes that the device subject to attachment is a LU of the second storage device 20, similarly to the detach command described above.

(7) Reattachment Processing for a LU of the Second Storage System 20 that has been Path Defined to an LDEV of the Storage System 2 in the Past FIG. 18 is a view showing an example of processing to reallocate a LU of the second storage system 20 to an LDEV of the storage system 2 after having been path defined to the LDEV of the storage system 2 in the past and then detached therefrom.

Note that the attachment processing shown in FIG. 17 is performed to allocate a new LU to an LDEV of the storage system 2, whereas the reattachment processing shown in FIG. 18 is performed to reattach a LU to an LDEV of the storage system 2 after having been allocated to the LDEV once in the past and then disengaged therefrom.

Furthermore, in cases where a LU that is path defined to the first LDEV is to be substituted for another LU, in FIGS. 16 and 17 the host computer 1 first issues a detach command relating to the first LU, then executes detachment processing on the storage system 2, then issues an attach command relating to the second LU, and then executes attachment processing on the storage system 2. In the processing shown in FIG. 18, however, detachment processing for the first LU and attachment processing for the second LU are executed in the storage system 2 simply by having the host computer 1 issue a single attach command relating to the second LU.

Note that detachment processing and attachment processing may be executed in the storage system 2 as a series of processes based on a single attach command regardless of whether the LU to be attached is a new LU or a LU that has been attached to an LDEV of the storage system 2 once before.

The juke box system manager program 314 transmits to the juke box system 6 (or in other words the command device) an attach command (step 1801). The attach command comprises identification information (a port ID (WWN) and host LUN set of the storage system 2) for the target device which is the subject of the attach command, the LDEV number of the LDEV allocated to the target device, and identification information (a port ID (WWN) and host LUN set of the second storage system 20) for the LU of the second storage system 20 that is to be reattached to the LDEV.

Having received the attach command, the command control program 208 interprets the command to be an attach command, and transmits an attachment request to the path control program (step 1802).

The path control program 209 specifies a port ID (WWN) and internal LUN of the storage system 2 serving as the identification information of the target device subject to processing (step 1803). This processing may be performed by referring to the access-permitted host list 219.

Next, the path control program 209 specifies the LDEV subject to processing (step 1804), and confirms that the specified LDEV is path-defined to the target device specified in step 1803. This processing may be performed by referring to the target device-LDEV mapping information 214.

The path control program 209 also specifies the LU of the second storage system 20 that is path defined to the LDEV specified in step 1804, and hence is the subject of detachment. The path control program 209 also specifies the LU of the second storage system 20 that is to be newly path defined to the LDEV, and hence is the subject of attachment (step 1805). At this time, the path control program 209 confirms that the LU to be attached is normal, not path defined to an LDEV of the storage system 2, and so on.

Following this confirmation processing, the path control program 209 detaches the path definition between the LDEV specified in step 1804 and the detachment subject LU specified in step 1805, creates definition information indicating that the attachment subject LU specified in step 1805 has been newly path defined, and transmits this definition information to the configuration control program 210 together with notification of the path definition setting modification (step 1806).

Having received this notification (step 1807), the configuration control program 210 updates the LDEV information 216 for the detachment subject LDEV and the attachment subject LDEV on the basis of the received definition information (step 1808), and notifies the path control program 209 of the completion of the LDEV information update.

Having received this notification (step 1809), the path control program 209 instructs the external storage subsystem connection program 2301 to modify the path definition setting (step 1810).

Having received this instruction, the external storage subsystem connection program 2301 detaches the path definition of the detachment subject LU specified in step 1805 to the LDEV specified in step 1804 (step 1811), and path-defines the attachment subject LU specified in step 1805 to the LDEV (step 1812). The external storage subsystem connection program 2301 then updates the external storage subsystem information 2303 in accordance with the path definition setting modification (step 1813). The content of the modification is similar to the detachment processing and attachment processing shown in FIGS. 16 and 17, and therefore not described in detail here. When the update of the external storage subsystem information 2303 is complete, the external storage subsystem connection program 2301 transmits an attachment completion response to the path control program 209.

Having received the attachment completion response, the path control program 209 transmits an attachment completion response to the command control program 208 (step 1814).

Having received the attachment completion response from the path control program 209, the command control program 208 transmits an attachment completion response to the host computer 1 (step 1815).

When the host computer 1 receives the attachment completion response (step 1816), the juke box system manager program 314 reacknowledges the target device, and if the capacity of the device has changed, detects this and confirms the capacity of the attached LU. The juke box system manager program 314 then allows I/O processing to recommence on the target device, reads the identification information of the target device, the identification information of the host computer (or the juke box system manager 5), and the date and time of path definition from a specific region of the attached. LU to confirm that the attachment subject LU is definitely attached (step 1817), and then ends the processing.

What is claimed is:

1. A storage system accessed from a computer, coupled to the computer and a second storage system, comprising:
   a first target device functioning as a first object of access from the computer;
   a command device which is a second target device functioning as a second object of access from the computer;
   a logical device allocated to the first target device; and
   a storage system controller which includes a memory storing a plurality of programs for an external storage connection mechanism and a juke box system, each of which is executed by the storage system controller,
   wherein the storage system controller controls allocation of the logical device to a third target device in the second storage system by executing the plurality of programs for the external storage connection mechanism, so that the first target device in the storage system is allocated to the third target device in the second storage system through the logical device and the computer stores data into the third target device via the first target device and the logical device,
   wherein the storage system controller changes a first relation between the third target device in the second storage system and the logical device in the storage system to a second relation between a fourth target device in the second storage system and the logical device in the storage system by executing the plurality of programs for the juke box system in accordance with receiving a command from the computer to the command device at the command device, the command includes information identifying the fourth target device,
   wherein, after changing the first relation to the second relation, the storage system controller controls allocation of the logical device to the fourth target device in the second storage system based on a result of the changing by the execution of the plurality of programs for external storage connection mechanism, so that the first target device in the storage system is allocated to the fourth target device in the second storage system through the logical device in the storage system instead of being allocated to the third target device and the computer stores data into the fourth target device via the first target device and the logical device, and
   wherein the third target device in the second storage system stores a first data sent by the computer during a first period, the fourth target device in the second storage system stores a second data sent by the computer during a second period after changing the first relation to the second relation.

2. A storage system according to claim 1, wherein the storage system controller transmits an input/output command to the third target device in the second storage system in accordance with receiving a second input/output command from the computer addressed to the first target device at the first target device by executing the plurality of programs for the external storage connection mechanism and using the first relation before changing the first relation to the second relation, and
   wherein the storage system controller transmits a third input/output command to the fourth target device in the second storage system in accordance with receiving a fourth input/output command from the computer addressed to the first target device at the first target device by executing the plurality of programs for the external storage connection mechanism and using the second relation after changing the first relation to the second relation.

3. A storage system according to claim 2, the storage system having identification information of a plurality of computers which are permitted to access to the first target device,
   wherein the command from the computer to the command device includes second information indicating the computer which issues the command, and
   if the computer is judged to be permitted to access to the first target device in the storage system based on the identification information in the storage system and the second information included in the command, the storage system controller changes the first relation to the second relation in accordance with receiving the command from the computer to the command device at the command device by executing the plurality of programs for the juke box system.

4. A storage system according to claim 1, wherein the command issued from the computer to the command device includes a detach instruction for detaching the third target device from the logical device, the detach instruction specifies the third target device in the second storage system, and
   on the basis of the detach instruction received from the computer, the storage system controller terminates the first relation by executing the plurality of programs.

5. A storage system according to claim 1, wherein the command issued from the computer to the command device includes an attach instruction for attaching the fourth target device to the logical device, the attach command specifies the first target device in the storage system and the fourth target device in the second storage system, and
   on the basis of the attach instruction received from the computer, the storage system controller creates the second relation between the fourth target device in the second storage system and the logical device in the storage system instead of the first relation.

6. A storage system according to claim 1, the storage system controller having an external storage subsystem information indicating a relationship between an identification information of the logical device and an identification information of target devices in the second storage system,
   wherein the storage system controller updates the external storage subsystem information in accordance with the changing of the first relation to the second relation.

7. A storage system according to claim 1,
wherein the storage system controller sends a third information specifying target devices in the second storage system to the computer if the storage system receives a second command from the computer at the command device, and
wherein the third information is used for creating the command in the computer.

8. A storage system according to claim 1, wherein the first period is a period of twelve months and the second period is another period of twelve months different from the first period.

* * * * *